United States Patent
Yang et al.

(10) Patent No.: US 12,394,811 B2
(45) Date of Patent: Aug. 19, 2025

(54) PERFORMANCE PREDICTION METHOD AND SYSTEM FOR FUEL CELL IN ANODE RECIRCULATION MODE

(71) Applicant: CATARC New Energy Vehicle Test Center (Tianjin) Co., Ltd., Tianjin (CN)

(72) Inventors: Zirong Yang, Tianjin (CN); Dong Hao, Tianjin (CN); Yanyi Zhang, Tianjin (CN); Xiaobing Wang, Tianjin (CN); Guang Chen, Tianjin (CN); Daokuan Jiao, Tianjin (CN); Yan Li, Tianjin (CN); Ruidi Wang, Tianjin (CN)

(73) Assignee: CATARC New Energy Vehicle Test Center (Tianjin) Co., Ltd. (CN)

( * ) Notice: Subject to any disclaimer, the term of this patent is extended or adjusted under 35 U.S.C. 154(b) by 516 days.

(21) Appl. No.: 18/077,717

(22) Filed: Dec. 8, 2022

(65) Prior Publication Data

US 2023/0369619 A1     Nov. 16, 2023

(30) Foreign Application Priority Data

May 10, 2022   (CN) .......................... 202210500031.8

(51) Int. Cl.
*H01M 8/04992* (2016.01)
*H01M 8/04089* (2016.01)
(Continued)

(52) U.S. Cl.
CPC ... *H01M 8/04992* (2013.01); *H01M 8/04097* (2013.01); *H01M 8/04328* (2013.01);
(Continued)

(58) Field of Classification Search
CPC ......... H01M 8/04992; H01M 8/04097; H01M 8/04388; H01M 8/04328; H01M 8/04492;
(Continued)

(56) References Cited

U.S. PATENT DOCUMENTS

2020/0168934 A1*   5/2020   Wang ................ H01M 8/04388

FOREIGN PATENT DOCUMENTS

CN            112909303         *   6/2021

OTHER PUBLICATIONS

CN112909303 English translation. Jiao et al. China. Jun. 4, 2021. (Year: 2021).*

* cited by examiner

*Primary Examiner* — Christopher P Domone
(74) *Attorney, Agent, or Firm* — Spencer Fane, LLP

(57) ABSTRACT

The present disclosure provides a performance prediction method and system for a fuel cell in an anode recirculation mode. The method includes: calculating output results of a membrane water transfer equation, a liquid water transfer equation, and a temperature transfer equation based on the membrane water transfer equation, the liquid water transfer equation, and the temperature transfer equation inside the fuel cell; calculating output results of a gas transfer equation based on output results of a first labeling equation according to a phenomenon of nitrogen transmembrane permeation inside the fuel cell; determining gas state parameters in the anode recirculation mode based on the output results of the temperature transfer equation and the gas transfer equation; and predicting output voltage performance of the fuel cell based on the gas state parameters in the anode recirculation mode and output results of a second labeling equation.

12 Claims, 8 Drawing Sheets

(51) Int. Cl.
*H01M 8/0432* (2016.01)
*H01M 8/04537* (2016.01)
*H01M 8/0438* (2016.01)

(52) U.S. Cl.
CPC .... *H01M 8/04552* (2013.01); *H01M 8/04388* (2013.01); *H01M 8/04395* (2013.01)

(58) Field of Classification Search
CPC ............ H01M 8/045; H01M 8/04395; H01M 8/04291; H01M 8/04529; H01M 8/0485
See application file for complete search history.

```
┌─────────────────────────────────────┐
│ Calculate output results of a membrane water    │
│ transfer equation, a liquid water transfer equation, │
│ and a temperature transfer equation based on the │──── 201
│ membrane water transfer equation, the liquid water │
│ transfer equation, and the temperature transfer  │
│ equation inside the fuel cell                    │
└─────────────────────────────────────┘
                    │
                    ▼
┌─────────────────────────────────────┐
│ Calculate output results of a gas transfer equation │
│ based on output results of a first labeling equation │──── 202
│ according to a phenomenon of nitrogen            │
│ transmembrane permeation inside the fuel cell    │
└─────────────────────────────────────┘
                    │
                    ▼
┌─────────────────────────────────────┐
│ Determine gas state parameters in the anode      │
│ circulation mode based on the output results of the │──── 203
│ temperature transfer equation and the gas transfer │
│ equation                                         │
└─────────────────────────────────────┘
                    │
                    ▼
┌─────────────────────────────────────┐
│ Predict output voltage performance of the fuel cell │
│ based on the gas state parameters in the anode   │──── 204
│ circulation mode and output results of a second  │
│ labeling equation                                │
└─────────────────────────────────────┘
                    │
                    ▼
┌─────────────────────────────────────┐
│ Control a flow rate of hydrogen supplied by a    │
│ hydrogen supply system according to the output   │──── 205
│ voltage performance of the fuel cell             │
└─────────────────────────────────────┘
```

FIG. 2

PERFORMANCE PREDICTION METHOD AND SYSTEM FOR FUEL CELL IN ANODE RECIRCULATION MODE

CROSS REFERENCE TO RELATED APPLICATION

This patent application claims the benefit and priority of Chinese Patent Application No. 202210500031.8, filed with the China National Intellectual Property Administration on May 10, 2022, the disclosure of which is incorporated by reference herein in its entirety as part of the present application.

TECHNICAL FIELD

The present disclosure relates to the technical field of proton exchange membrane fuel cells (PEMFCs), and in particular, to a performance prediction method and system for a fuel cell in an anode recirculation mode.

BACKGROUND

Hydrogen energy is regarded as clean secondary energy with broad application prospects and even strategic significance, and has been highly valued by countries around the world. The PEMFC is one of the core technologies for development of the hydrogen energy industry, which has the advantages of high power density, high energy conversion efficiency, and zero emissions.

The flow rate of hydrogen as the anode reactant gas of the fuel cell directly affects the output power and the energy utilization rate. Insufficient hydrogen supply will cause gas starvation inside the fuel cell, reducing the output performance and durability of the fuel cell. However, excessive hydrogen supply will cause fuel waste, resulting in a decrease in energy efficiency. In a fuel cell vehicle, the hydrogen supply system is provided with a hydrogen circulation loop, which circulates the hydrogen from the anode outlet of the fuel cell stack to the anode inlet of the fuel cell stack, so as to improve the hydrogen utilization rate and cruising range of the vehicle. Since the anode tail gas of the fuel cell stack contains unconsumed hydrogen and water vapor generated by the electrochemical reaction, the hydrogen cycle process can humidify the anode inlet gas of the fuel cell stack to a certain extent and improve the water management state of the fuel cell stack. Although the permeability of the proton exchange membrane (PEM) to gas is extremely low, nitrogen will continue to permeate from the cathode to the anode driven by the pressure gradient of the cathode and anode gas and accumulate over time. As a result, it is difficult for hydrogen to be transferred to the effective active sites of the anode catalyst layer (ACL), such that the electrochemical reaction cannot occur, resulting in a decrease in output performance.

SUMMARY

An objective of the present disclosure is to provide a performance prediction method and system for a fuel cell in an anode recirculation mode, so as to improve the prediction accuracy of the output performance of the fuel cell.

To achieve the above objective, the present disclosure provides the following technical solutions:

In a first aspect, the present disclosure provides a performance prediction method for a fuel cell in an anode recirculation mode. The fuel cell includes a cathode plate, a cathode flow channel, a cathode gas diffusion layer (GDL), a cathode microporous layer (CMPL), a cathode catalyst layer (CCL), a PEM, an ACL, an anode microporous layer (AMPL), an anode GDL, and an anode flow channel, and an anode plate in sequence in a nitrogen permeation direction. The performance prediction method for a fuel cell in an anode recirculation mode includes:

calculating output results of a membrane water transfer equation, a liquid water transfer equation, and a temperature transfer equation based on the membrane water transfer equation, the liquid water transfer equation, and the temperature transfer equation inside the fuel cell;

calculating output results of a gas transfer equation based on output results of a first labeling equation according to a phenomenon of nitrogen transmembrane permeation inside the fuel cell, where the output results of the first labeling equation include the output results of the liquid water transfer equation, the temperature transfer equation, and the membrane water transfer equation;

determining gas state parameters in the anode recirculation mode based on the output results of the temperature transfer equation and the gas transfer equation; and predicting output voltage performance of the fuel cell based on the gas state parameters in the anode recirculation mode and output results of a second labeling equation, where the output results of the second labeling equation include the output results of the liquid water transfer equation, the temperature transfer equation, and the gas transfer equation.

In a second aspect, the present disclosure provides a performance prediction system for a fuel cell in an anode recirculation mode. The fuel cell includes a cathode plate, a cathode flow channel, a cathode GDL, a CMPL, a CCL, a PEM, an ACL, an AMPL, an anode GDL, and an anode flow channel, and an anode plate in sequence in a nitrogen permeation direction. The performance prediction system for a fuel cell in an anode recirculation mode includes:

a first equation output result determination module configured to calculate output results of a membrane water transfer equation, a liquid water transfer equation, and a temperature transfer equation based on the membrane water transfer equation, the liquid water transfer equation, and the temperature transfer equation inside the fuel cell;

a second equation output result determination module configured to calculate output results of a gas transfer equation based on output results of a first labeling equation according to a phenomenon of nitrogen transmembrane permeation inside the fuel cell, where the output results of the first labeling equation include the output results of the liquid water transfer equation, the temperature transfer equation, and the membrane water transfer equation;

an anode recirculation mode gas state parameter determination module configured to determine gas state parameters in the anode recirculation mode based on the output results of the temperature transfer equation and the gas transfer equation; and a fuel cell output voltage performance prediction module configured to predict output voltage performance of the fuel cell based on the gas state parameters in the anode recirculation mode and output results of a second labeling equation, where the output results of the second labeling equation include the output results of the liquid water transfer equation, the temperature transfer equation, and the gas transfer equation.

According to the specific embodiments provided by the present disclosure, the present disclosure discloses the following technical effects:
(1) The present disclosure provides the performance prediction method and system for a fuel cell in an anode recirculation mode, which calculates the nitrogen transmembrane permeation inside the fuel cell, characterizes the nitrogen distribution at the anode of the fuel cell and the "water-gas-heat-electricity" parameter distribution inside the fuel cell, and predicts the output performance of the fuel cell in the anode recirculation mode.
(2) The present disclosure provides the performance prediction method and system for a fuel cell in an anode recirculation mode, which makes up for the low prediction accuracy of the existing models that lack the nitrogen transmembrane permeation mechanism, can provide simulation data support for the development of anode exhaust strategies, and greatly reduces the experimental cost and development cycle.

BRIEF DESCRIPTION OF THE DRAWINGS

To describe the embodiments of the present disclosure or the technical solutions in the related art more clearly, the accompanying drawings required in the embodiments are briefly introduced below. Obviously, the accompanying drawings described below are only some embodiments of the present disclosure. Those of ordinary skill in the art may further obtain other accompanying drawings based on these accompanying drawings without creative labor.

FIG. 2 is a flow chart of a performance prediction method for a fuel cell in an anode recirculation mode according to the present disclosure;

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

At present, the distribution of nitrogen permeating across the membrane in the gas flow direction inside the anode and its influence law have not been revealed around the world, and this phenomenon is very important for guiding the development of the anode exhaust strategies (such as opening duration, opening interval time, and opening amplitude). Therefore, it is necessary to provide a technology for predicting performance of a fuel cell in an anode recirculation mode, so as to meet the technical development needs of the anode exhaust strategies of the fuel cell. In view of this, the present disclosure provides a performance prediction method and system for a fuel cell in an anode recirculation mode, which can calculate the nitrogen transmembrane permeation, characterizes the nitrogen distribution at the anode of the fuel cell and the "water-gas-heat-electricity" parameter distribution inside the fuel cell, and predicts the output performance of the fuel cell, thereby making up for the low prediction accuracy of the existing models that lack the nitrogen transmembrane permeation mechanism, providing simulation data support for the development of anode exhaust strategies, and greatly reducing the experimental cost and development cycle.

To make the above-mentioned objective, features, and advantages of the present disclosure clearer and more comprehensible, the present disclosure will be further described in detail below in conjunction with the accompanying drawings and specific embodiments.

Embodiment I

Figure 1:
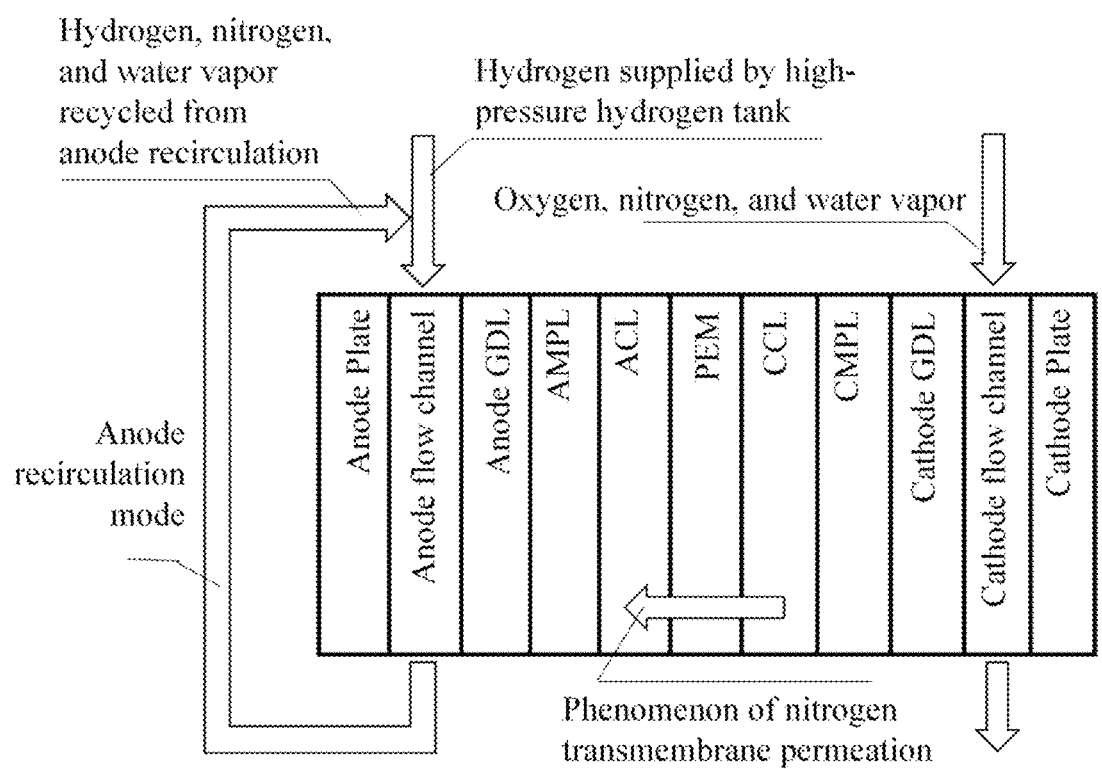
FIG. 1 is a schematic model diagram of a fuel cell in an anode recirculation mode according to the present disclosure.

As shown in FIG. 1, the fuel cell includes a cathode plate, a cathode flow channel, a cathode GDL, a CMPL, a CCL, a PEM, an ACL, an AMPL, an anode GDL, and an anode flow channel, and an anode plate in sequence in a nitrogen permeation direction.

As shown in FIG. 2, a performance prediction method for a fuel cell in an anode recirculation mode provided by the embodiment of the present disclosure includes the following steps.

In step 201: output results of a membrane water transfer equation, a liquid water transfer equation, and a temperature transfer equation are calculated based on the membrane water transfer equation, the liquid water transfer equation, and the temperature transfer equation inside the fuel cell.

The output results of the membrane water transfer equation include: contents of membrane water in the ACL, the PEM, and the CCL.

The output results of the liquid water transfer equation include: volume fractions of liquid water in the anode GDL, the AMPL, the ACL, the cathode GDL, the CMPL, and the CCL.

The output results of the temperature transfer equation include temperatures in the anode plate, the anode flow channel, the anode GDL, the AMPL, the ACL, the PEM, the CCL, the CMPL, the cathode GDL, the cathode flow channel, and the cathode plate.

In step 202: output results of a gas transfer equation are calculated based on output results of a first labeling equation according to a phenomenon of nitrogen transmembrane permeation inside the fuel cell. The output results of the first labeling equation include the output results of the liquid water transfer equation, the temperature transfer equation, and the membrane water transfer equation.

The output results of the gas transfer equation include a nitrogen concentration set, a water vapor concentration set, a hydrogen concentration set, and an oxygen concentration set.

The nitrogen concentration set includes nitrogen concentrations in the anode flow channel, the anode GDL, the AMPL, the ACL, the CCL, the CMPL, the cathode GDL, and the cathode flow channel.

The water vapor concentration set includes water vapor concentrations in the anode flow channel, the anode GDL, the AMPL, the ACL, the CCL, the CMPL, the cathode GDL, and the cathode flow channel.

The hydrogen concentration set includes hydrogen concentrations in the anode flow channel, the anode GDL, the AMPL, and the ACL.

The oxygen concentration set includes oxygen concentrations in the CCL, the CMPL, the cathode GDL, and the cathode flow channel.

In step 203: gas state parameters in the anode recirculation mode are determined based on the output results of the temperature transfer equation and the gas transfer equation.

In step 204: output voltage performance of the fuel cell is predicted based on the gas state parameters in the anode recirculation mode and output results of a second labeling equation. The output results of the second labeling equation include the output results of the liquid water transfer equation, the temperature transfer equation, and the gas transfer equation.

In step 205: a flow rate of hydrogen supplied by a hydrogen supply system is controlled according to the output voltage performance of the fuel cell. The hydrogen supply system is provided with a hydrogen circulation loop and a high-pressure hydrogen tank.

In a preferred embodiment, a back pressure valve may be controlled according to the output results of the gas transfer equation and the output voltage performance of the fuel cell.

As a preferred implementation, before step 201 is performed, the performance prediction method for a fuel cell provided by the embodiment of the present disclosure further includes determining structural design parameters and operating condition parameters of the fuel cell.

In an example: the structural design parameters of the fuel cell are as follows.

Effective reaction area: 25 cm$^2$; thickness of electrode plate: 2 mm; thickness of flow channel: 1 mm; thickness of GDL: 0.2 mm; thickness of microporous layer (MPL): 0.02 mm; thickness of catalyst layer: 0.01 mm; thickness of PEM: 0.025 mm; length of flow channel: 0.10 m; and ratio of widths of flow channel to rib: 1.

Density of electrode plate: 1,000 kg m$^{-3}$; density of GDL: 1,000 kg m$^{-3}$; density of MPL: 1,000 kg m$^{-3}$; density of catalyst layer: 1,000 kg m$^{-3}$; and density of PEM: 1,980 kg m$^3$.

Specific heat capacity of electrode plate: 1,580 J kg$^{-1}$ K$^{-1}$; specific heat capacity of GDL: 2,000 J kg$^{-1}$ K$^{-1}$; specific heat capacity of MPL: 568 J kg$^{-1}$ K$^{-1}$; specific heat capacity of catalyst layer: 3,300 J kg$^{-1}$ K$^{-1}$; and specific heat capacity of PEM: 833 J kg$^{-1}$ K$^{-1}$.

Thermal conductivity of electrode plate: 20 W m$^{-1}$ K$^{-1}$; thermal conductivity of GDL: 1.0 W m$^{-1}$ K$^{-1}$; thermal conductivity of MPL: 1.0 W m$^{-1}$ K$^{-1}$; thermal conductivity of catalyst layer: 1.0 W m$^{-1}$ K$^{-1}$; and thermal conductivity of PEM: 0.95 W m$^{-1}$ K$^{-1}$.

Electrode conductivity of electrode plate: 20,000 S m$^{-1}$; electrode conductivity of GDL: 300 S m$^{-1}$; electrode conductivity of MPL: 300 S m$^{-1}$; electrode conductivity of catalyst layer: 300 S m$^{-1}$; and electrode conductivity of PEM: 300 S m$^{-1}$.

Porosity of catalyst layer: 0.3; porosity of MPL: 0.4; and porosity of GDL: 0.6.

Contact angle of catalyst layer: 100°; contact angle of MPL: 100°; and contact angle of GDL: 120°.

Polymer volume fraction in catalytic layer: 0.4; polymer volume fraction in PEM: 1; equivalent mass of PEM: 1.1 kg mol$^{-1}$; and equivalent volume of PEM: 18×10$^{-6}$ m$^3$ mol$^{-1}$.

The phase change transition rates between membrane water and water vapor, between membrane water and liquid water, and between liquid water and water vapor are: 1.0 s$^{-1}$, 1.0 s$^{-1}$, and 1,000.0 s$^{-1}$ respectively.

Reference reaction rates of the anode and cathode are: 10$^8$ A m$^{-3}$ and 100 A m$^{-3}$ respectively.

Concentrations of reference hydrogen and reference oxygen are: 20 mol m$^{-3}$ and 10 mol m$^{-3}$ respectively.

A coefficient of latent heat of evaporation is: 2.308×10$^6$ J kg$^{-1}$.

The above-mentioned electrode plate includes an anode plate and a cathode plate. The flow channel includes an anode flow channel and a cathode flow channel. The MPL includes an AMPL and a CMPL. The catalyst layer includes an ACL and a CCL.

The operating condition parameters of the fuel cell are as follows.

A current density is: 1.0 A cm$^{-2}$. Inlet gas pressures of the cathode and the anode are: 1.2 atm and 1.2 atm respectively. Inlet relative humidities of the cathode and the anode are: 1 and 0 respectively. Stoichiometric ratios of the cathode and the anode are: 1.5 and 1.2 respectively. Inlet gas temperatures of the cathode and the anode are: 60° C. and 60° C. respectively. An ambient temperature is: 25° C. A temperature of hydrogen at the outlet of the hydrogen tank is: 25° C. An initial content of member water is: 6.0. An initial volume fraction of liquid water is: 0. An initial nitrogen concentration inside the anode is: 0 mol m$^{-3}$. A time stride is: 0.1 s.

As a preferred implementation, step 201 specifically includes the following sub-steps.

(1) The output results of the membrane water transfer equation at a current moment are calculated.

The membrane water transfer equation is solved in the ACL, the PEM, and the CCL. The membrane water transfer equation is:

$$\frac{\rho_{MEM}}{EW} \frac{\partial(\omega\lambda)}{\partial t} = \frac{\rho_{MEM}}{EW} \nabla \cdot \left(\omega^{1.5} D_{mw} \nabla \lambda\right) + S_{mw}. \quad (1)$$

In the formula (1), $\rho_{MEM}$ represents a density of the PEM, EW represents an equivalent mass of the PEM, ω represents a polymer volume fraction, λ here represents a content of membrane water, t represents a time, $D_{mw}$ represents a diffusion coefficient of the membrane water, $S_{mw}$ represents a source term of the membrane water, $\nabla\cdot$ represents a divergence, and ∇ represents a gradient. The polymer volume fraction here includes the polymer volume fraction of the ACL, the PEM, and the CCL.

At the last moment, the contents of membrane water in the ACL, the PEM, and the CCL are 3.895, 7.153, and 15.203 respectively, and the temperatures are 329.259 K, 329.312 K, and 329.356 K respectively.

A diffusion coefficient of membrane water at the current moment is determined based on the temperature at the last moment and the content of membrane water at the last moment. Obviously, it can be calculated by the following formulas that at the current moment, the diffusion coefficients of membrane water in the ACL, the PEM, and the CCL are 3.761×10$^{-8}$ m$^2$ s$^{-1}$, 2.763×10$^{-8}$ m$^2$ s$^{-1}$, and 5.140×10$^{-8}$ m$^2$ s$^{-1}$ respectively.

A formula for calculating the diffusion coefficient of membrane water at the current moment is:

$$D_{mw} = \begin{cases} 2.693 \times 10^{-10} & (\lambda \leq 2) \\ 10^{-10}\exp\left[2416\left(\frac{1}{303} - \frac{1}{T}\right)\right][0.87(3-\lambda) + & (2 < \lambda \leq 3) \\ 2.95(\lambda - 2)] \\ 10^{-10}\exp\left[2416\left(\frac{1}{303} - \frac{1}{T}\right)\right][2.95(4-\lambda) + & (3 < \lambda \leq 4) \\ 1.64(\lambda - 3)] \\ 10^{-10}\exp\left[2416\left(\frac{1}{303} - \frac{1}{T}\right)\right][2.563 - 0.33\lambda + & (\lambda > 4) \\ 0.0264\lambda^2 - 0.000671\lambda^3] \end{cases} \quad (2)$$

In the formula (2), T represents the temperature at the last moment, and $\lambda$ represents the content of the membrane water at the last moment.

A calculation expression for the parameter value of the source term of the membrane water at the current moment is as follows:

$$S_{mw} = \begin{cases} S_{react} - S_{m-v} - S_{m-l} + S_{EOD} & (CCL) \\ -S_{m-v} - S_{m-l} + S_{per} - S_{EOD} & (ACL) \\ 0 & (PEM) \end{cases} \quad (3)$$

In the formula (3), $S_{mw}$ represents the parameter value of the source term of the membrane water at the current moment, $S_{react}$ represents the parameter value of the water source term of the electrochemical reaction product at the current moment, $S_{m-v}$ represents the parameter value of the phase change transition source term between the membrane water and water vapor at the current moment, $S_{m-l}$ represents the parameter value of the phase change transition source term between the membrane water and liquid water at the current moment, $S_{EOD}$ represents the parameter value of the source term of the electro-osmotic drag (EOD) effect at the current moment, and $S_{per}$ represents the parameter value of the source term of the hydraulic permeability effect at the current moment.

A formula for calculating the parameter value of the water source term of the electrochemical reaction product at the current moment is:

$$S_{react} = \frac{I}{2F\delta_{CLc}}. \quad (4)$$

In the formula (4), I is the current density, F is the Faraday constant, and $\delta_{CLc}$ is the thickness of the CCL.

The parameter value of the phase change transition source term between the membrane water and water vapor at the current moment is determined based on the content of the membrane water at the last moment, the content of equilibrium membrane water at the current moment, and the temperature at the last moment. Its calculation equation is:

$$S_{m-v} = \xi_{mv}\frac{\rho_{MEM}}{EW}(\lambda - \lambda_{eq}). \quad (5)$$

In the formula (5), $\xi_{mv}$ represents the phase change transition rate between the membrane water and the water vapor, and $\lambda$ represents the content of the membrane water at the last moment.

$$\lambda_{eq} = \begin{cases} 0.043 + 17.81a - 39.85a^2 + 36.0a^3 & (0 \leq a < 1) \\ 14.0 + 1.4(a-1) & (1 < a \leq 3) \end{cases}. \quad (6)$$

In the formula (6), $\lambda_{eq}$ represents the content of equilibrium membrane water at the current moment.

$$a = \frac{p_{vp}}{p_{sat}}.$$

a represents the water activity. $p_{vp}$ represents the water vapor concentration at the last moment. $p_{sat}$ represents the saturated vapor pressure at the current moment.

$$\log_{10}\left(\frac{p_{sat}}{101325}\right) = -2.1794 + 0.02953(T - 273.15) - \quad (7)$$
$$9.1837 \times 10^{-5}(T - 273.15)^2 + 1.4454 \times 10^{-7}(T - 273.15)^3.$$

In the formula (7), T represents the temperature at the last moment.

The parameter value of the phase change transition source term between the membrane water and liquid water at the current moment is determined based on the content of the membrane water at the last moment and the temperature at the last moment. Its calculation formula is:

$$S_{m-l} = \begin{cases} \xi_{ml}\frac{\rho_{MEM}}{EW}(\lambda - \lambda_{sat}) & (\lambda > \lambda_{sat}) \\ 0 & (\lambda < \lambda_{sat}) \end{cases}. \quad (8)$$

In the formula (8), $\xi_{ml}$ represents the phase change transition rate between the membrane water and the liquid water, and $\lambda$ represents the content of the membrane water at the last moment.

$$\lambda_{sat} = \begin{cases} 4.837 & (T \leq 223.15) \\ [-1.304 + 0.01479T - 3.594 \times 10^{-5}T^2]^{-1} & (223.15 \leq T < T_N) \\ 14.0 & (T \geq T_N) \end{cases}. \quad (9)$$

In the formula (9), $\lambda_{sat}$ represents the saturated membrane water content at the current moment, and T represents the temperature at the last moment.

The parameter value of the source term of the EOD effect at the current moment is determined based on the current density and the content of the membrane water at the last moment. Its calculation formula is as follows:

$$S_{EOD} = \begin{cases} \frac{n_d I}{F\delta_{CLa}} & (ACL) \\ \frac{n_d I}{F\delta_{CLc}} & (CCL) \end{cases}. \quad (10)$$

In the formula (10), $$n_d = \frac{2.5\lambda}{22},$$

$\lambda$ represents the content of the membrane water at the last moment, $n_d$ represents the EOD coefficient, I represents the current density, F represents the Faraday constant, $\delta_{CLa}$ represents the thickness of the ACL, and $\delta_{CLc}$ represents the thickness of the CCL.

The parameter value of the source term of the hydraulic permeability effect at the current moment is determined based on the hydraulic pressure at the last moment, the content of the membrane water at the last moment, and the temperature at the last moment. Its calculation formula is:

$$S_{per} = \frac{\rho_{lq} K_{per}(p_{l,CLc} - p_{l,CLa})}{\mu_{lq} \delta_{CLc}(0.5\delta_{CLa} + \delta_{MEM} + 0.5\delta_{CLc})}. \quad (11)$$

In the formula (11), $\rho_{lq}$ represents the density of liquid water. $K_{per}=2.86\times10^{-20}$, and $K_{per}$ represents the hydraulic permeability coefficient. $p_{l,CLc}$ and $p_{l,CLa}$ represent the hydraulic pressure of the CCL at the last moment and the hydraulic pressure of the ACL at the last moment respectively. $\mu_{lq}$ represents the hydrodynamic viscosity of the liquid water at the current moment. $\delta_{CLa}$, $\delta_{MEM}$, and $\delta_{CLc}$ represent the thicknesses of the ACL, the PEM, and the CCL. $\lambda$ represents the content of the membrane water at the last moment.

A formula for calculating the parameter value of the hydrodynamic viscosity of the liquid water at the current moment is as follows:

$$\mu_{lq} = 2.414 \times 10^{-5} \times 10^{\frac{247.8}{T-140}}. \quad (12)$$

In the formula (12), T represents the temperature at the last moment.

Through the above calculations, at the current moment, the parameter value of the water source term of the electrochemical reaction product is 5.052 kmol m$^{-3}$ s$^{-1}$. The parameter values of the phase change transition source term between the membrane water and the water vapor in the ACL and the CCL are −0.170 kmol m$^{-3}$ s$^{-1}$ and 2.144 kmol m$^{-3}$ s$^{-3}$. The parameter values of the phase change transition source term between the membrane water and the liquid water in the ACL and the CCL are 0 and 2.144 kmol m$^{-3}$ s$^{-1}$. The parameter values of the source term of the EOD effect in the ACL, the PEM, and the CCL are −6.642 kmol m$^{-3}$ s$^{-1}$, −3.747 kmol m$^{-3}$ s$^{-1}$, and 16.009 kmol m$^{-3}$ s$^{-1}$. The parameter value of the source term of the hydraulic permeability effect is 0.056 kmol m$^{-3}$ s$^{-1}$.

Based on the above, it is determined that at the current moment, the parameter values of the source term of the membrane water in the ACL, the PEM, and the CCL are −6.109 kmol m$^{-3}$ s$^{-1}$, −3.622 kmol m$^{-3}$ s$^{-1}$, and 16.441 kmol m$^{-3}$ s$^{-1}$.

The calculation results of the diffusion coefficient of the membrane water at the current moment and the source term of the membrane water at the current moment are substituted into the membrane water transfer equation, and it is obtained that at the current moment, the contents of the membrane water in the ACL, the PEM, and the CCL are 3.899, 7.160, and 15.200 respectively.

(2) The output results of the liquid water transfer equation at the current moment are calculated.

The liquid water transfer equation is solved in the anode GDL, the AMPL, the ACL, the CCL, the CMPL, and the cathode GDL. An expression of the liquid water transport equation is:

$$\frac{\partial(\varepsilon \rho_{lq} s_{lq})}{\partial t} = \nabla \cdot \left( \rho_{lq} \frac{K_{lq}}{\mu_{lq}} \nabla p_l \right) + S_{lq}. \quad (13)$$

In the formula (13), $\varepsilon$ represents a porosity, $\rho_{lq}$ represents a density of liquid water, $s_{lq}$ represents a volume fraction of the liquid water, t represents a time, $K_{lq}$ represents a permeability of the liquid water, $\mu_{lq}$ represents a dynamic viscosity of the liquid water, $p_l$ represents a hydraulic pressure, $S_{lq}$ represents a source term of the liquid water, and $\nabla$ represents a gradient.

At the last moment, the volume fractions of liquid water of the anode GDL, the AMPL, and the ACL are $1.075\times10^{-3}$, $3.796\times10^{-2}$, and $1.511\times10^{-1}$ respectively. The volume fractions of liquid water of the CCL, the CMPL, and the cathode GDL are $1.050\times10^{-1}$, $2.108\times10^{-2}$, and $2.352\times10^{-2}$ respectively. The temperatures of the anode GDL, the AMPL, and the ACL are 328.459 K, 329.190 K, and 329.259 K respectively. The temperatures of the CCL, the CMPL, and the cathode GDL are 329.356 K, 329.294 K, and 328.515 K respectively.

A calculation expression for the parameter value of the source term of the liquid water at the current moment is as follows:

$$S_{lq} = \begin{cases} S_{m-l}M_{H_2O} + S_{v-l} - S_{per}M_{H_2O} & (CCL) \\ S_{m-l}M_{H_2O} + S_{v-l} & (ACL) \\ S_{v-l} & (MPL \text{ and } GDL) \end{cases} \quad (14)$$

In the formula (14), $S_{lq}$ represents the parameter value of the source term of the liquid water at the current moment, $S_{m-l}$ represents the parameter value of the phase change transition source term between the membrane water and the liquid water at the current moment, $S_{v-l}$ represents the parameter value of the phase change transition source term between the liquid water and the water vapor at the current moment, $S_{per}$ represents the parameter value of the source term of the hydraulic permeability effect at the current moment, and $M_{H_2O}$ represents the molar mass of water.

The parameter value of the phase change transition source term between the membrane water and the liquid water at the current moment is determined based on the content of the membrane water at the last moment and the temperature at the last moment. Its calculation formula is the same as the formula (8).

The parameter value of the phase change transition source term between the membrane water and the water vapor at the current moment is determined based on the water vapor concentration at the last moment, the volume fraction of the liquid water at the last moment, and the temperature at the last moment. Its calculation formula is as follows:

$$S_{v-l} = \begin{cases} \xi_{vl}\varepsilon(1-s_{lq})\frac{(p_{vp}-p_{sat})}{RT} & (p_{vp} > p_{sat}) \\ \xi_{vl}\varepsilon s_{lq}\frac{(p_{vp}-p_{sat})}{RT} & (p_{vp} < p_{sat}) \end{cases} \quad (15)$$

In the formula (15), $\xi_{vl}$ represents the phase change transition rate between the liquid water and the water vapor. $\varepsilon$ represents the porosity. $s_{lq}$ represents the volume fraction of the liquid water at the last moment. $p_{vp}$ represents the partial pressure of water vapor at the current moment. $p_{vp}=c_{vp}RT$. R represents an ideal gas constant. T represents the temperature at the last moment. $c_{vp}$ represents the water vapor concentration at the last moment.

$$\log_{10}\left(\frac{p_{sat}}{101325}\right) = -2.1794 + 0.02953(T - 273.15) - 9.1837 \times \\ 10^{-5}(T - 273.15)^2 + 1.4454 \times 10^{-7}(T - 273.15)^3. \quad (16)$$

In the formula (16), $p_{sat}$ represents the saturated vapor pressure at the current moment, and T represents the temperature at the last moment.

The parameter value of the source term of the hydraulic permeability effect at the current moment is determined based on the hydraulic pressure at the last moment, the temperature at the last moment, and the content of the membrane water at the last moment. Its calculation formula is as follows:

$$S_{per} = \frac{\rho_{lq} K_{per}(p_{l,CLc} - p_{l,CLa})}{\mu_{lq} \delta_{CLc}(0.5\delta_{CLa} + \delta_{MEM} + 0.5\delta_{CLc})}. \quad (17)$$

In the formula (17), $\rho_{lq}$ represents the density of the liquid water. $K_{per}$ represents the hydraulic permeability coefficient, and $K_{per} = 2.86 \times 10^{-20}$. $p_{l,CLc}$ and $p_{l,CLa}$ represent the hydraulic pressure of the CCL at the last moment and the hydraulic pressure of the ACL at the last moment respectively. $\mu_{lq}$ represents the hydrodynamic viscosity of the liquid water at the current moment. $\delta_{CLa}$, $\delta_{MEM}$, and $\delta_{CLc}$ represent the thicknesses of the ACL, the PEM, and the CCL. $\lambda$ represents the content of the membrane water at the last moment.

Through the above calculations, it is obtained that at the current moment, the parameter values of the phase change transition source term between the membrane water and the liquid water in the ACL and the CCL are 0 and 2.144 kmol m$^{-3}$ s$^{-1}$. The parameter values of the phase change transition source term between the liquid water and the water vapor in the anode GDL, the AMPL, and the ACL are −0.006 kg m$^{-3}$ s$^{-1}$, −0.127 kg m$^{-3}$ s$^{-1}$, and −0.513 kg m$^{-3}$ s$^{-3}$. The parameter values of the phase change transition source term between the liquid water and the water vapor in the CCL, the CMPL, and the cathode GDL are 3.011 kg m$^{-3}$ s$^{-1}$, 2.816 kg m$^{-3}$ s$^{-1}$, and 2.495 kg m$^{-3}$ s$^{-1}$.

Based on the above calculations, it is obtained that at the current moment, the parameter values of the source term of the liquid water of the anode GDL, the AMPL, and the ACL are −0.006 kg m$^{-3}$ s$^{-1}$, −0.127 kg m$^{-3}$ s$^{-1}$, and −0.513 kg m$^{-3}$ s$^{-1}$ respectively, and the parameter values of the source term of the liquid water of the CCL, the CMPL, and the cathode GDL are 40.552 kg m$^{-3}$ s$^{-1}$, 2.816 kg m$^{-3}$ s$^{-1}$, and 2.495 kg m$^{-3}$ s$^{-1}$ respectively.

The above hydrodynamic viscosity of the liquid water, the source term of the liquid water, and the structural parameters of the fuel cell are substituted into the liquid water transfer equation, and it is obtained that at the current moment, the hydraulic pressures of the anode GDL, the AMPL, and the ACL are 121,607.3 Pa, 121,954.8 Pa, and 122,962.7 Pa respectively, and the hydraulic pressures of the CCL, the CMPL, and the cathode GDL are 122,607.5 Pa, 122,363.8 Pa, and 121,949.6 Pa respectively.

After the hydraulic pressure is solved, the volume fraction of the liquid water at the current moment is calculated by the value of the capillary pressure. Its calculation formula is:

$$p_c = p_g - p_l \quad (18).$$

In the formula (18), $p_l$ represents the hydraulic pressure at the current moment, $p_g$ represents the air pressure, and $p_c$ represents the capillary pressure at the current moment.

$$p_c = \begin{cases} \sigma \cos(\theta)\left(\frac{\varepsilon}{K^0}\right)^{0.5}[1.42(1-s_{lq}) - & (\theta < 90°) \\ 2.12(1-s_{lq})^2 + 1.26(1-s_{lq})^3] \\ \sigma \cos(\theta)\left(\frac{\varepsilon}{K^0}\right)^{0.5}[1.42s_{lq} - & (\theta > 90°) \\ 2.12s_{lq}^2 + 1.26s_{lq}^3] \end{cases} \quad (19)$$

In the formula (19), $\sigma$ represents the surface tension coefficient, $\theta$ represents the contact angle, $\varepsilon$ represents the porosity, $K^0$ represents the intrinsic permeability, and $s_{lq}$ represents the volume fraction of the liquid water at the current moment.

The above hydraulic pressure values are substituted, and it is obtained that at the current moment, the capillary pressures of the anode GDL, the AMPL, and the ACL are −17.3 Pa, −1,364.8 Pa, and −1,372.7 Pa respectively. The capillary pressures of the CCL, the CMPL, and the cathode GDL are −1,017.5 Pa, −773.8 Pa, and −359.6 Pa respectively. The volume fractions of the liquid water of the anode GDL, the AMPL, and the ACL are 1.082×10$^{-3}$, 3.804×10$^{-2}$, and 1.515×10$^{-1}$ respectively. The volume fractions of the liquid water of the CCL, the CMPL, and the cathode GDL are 1.049×10$^{-1}$, 2.108×10$^{-2}$, and 2.349×10$^{-2}$ respectively.

(3) The output results of the temperature transfer equation at the current moment are calculated.

The temperature transfer equation is solved in the anode plate, the anode flow channel, the anode GDL, the AMPL, the ACL, the PEM, the CCL, the CMPL, the cathode GDL, the cathode flow channel, and the cathode plate. Its expression is as follows:

$$\frac{\partial}{\partial t}\left((\rho c_p)_{fl,sl}^{eff} T\right) = \nabla \cdot \left(k_{fl,sl}^{eff} \nabla T\right) + S_T. \quad (20)$$

In the formula (20), $(\rho c_p)_{fl,sl}^{eff}$ represents an effective density specific heat capacity, T represents a temperature, t represents a time, $K_{fl,sl}^{eff}$ represents an effective thermal conductivity, and $S_T$ represents a heat source term.

At the last moment, temperatures of the anode plate, the anode flow channel, the anode GDL, the AMPL, the ACL, the PEM, the CCL, the CMPL, the cathode GDL, the cathode flow channel, and the cathode plate are 327.419 K, 327.631 K, 328.459 K, 329.190 K, 329.259 K, 329.312 K, 329.356 K, 329.294 K, 328.515 K, 327.680 K, and 327.517 K respectively.

The effective density specific heat capacity at the current moment and the effective thermal conductivity at the current moment are both determined based on the volume fraction of the liquid water at the last moment. Their calculation formulas are as follows:

$$(\rho c_p)_{fl,sl}^{eff} = \varepsilon[s_{lq}\rho_{lq}(c_p)_{lq} + (1-s_{lq})\rho_g(c_p)_g] + (1-\varepsilon-\omega)\rho_s \\ (c_p)_s + \omega\rho_{MEM}(c_p)_{MEM} \quad (21), \text{ and}$$

$$k_{fl,sl}^{eff} = \varepsilon[s_{lq}k_{lq} + (1-s_{lq})k_g] + (1-\varepsilon-\omega)k_s + \omega k_{MEM} \quad (22).$$

In the formulas (21) and (22), $\varepsilon$ represents the porosity, $s_{lq}$ represents the volume fraction of the liquid water at the last moment, $\rho_{lq}$ represents the density of the liquid water, $(c_p)_{lq}$ represents the specific heat capacity of the liquid water, $p_g$ represents the density of the gas, $(c_p)_g$ represents the specific heat capacity of the gas, ω represents the polymer volume fraction, $\rho_s$ represents the density of the solid matrix, $(c_p)_s$ represents the specific heat capacity of the solid matrix, $\rho_{MEM}$ represents the density of the PEM, $(c_p)_{MEM}$ represents the specific heat capacity of the PEM, $k_{lq}$ represents the thermal conductivity of the liquid water, $k_g$ represents the thermal conductivity of the gas, $k_s$ represents the thermal conductivity of the solid matrix, and kMEM represents the thermal conductivity of the PEM.

Through the above calculations, it is obtained that at the current moment, effective thermal conductivities of the anode plate, the anode flow channel, the anode GDL, the AMPL, the ACL, the PEM, the CCL, the CMPL, the cathode GDL, the cathode flow channel, and the cathode plate are 20.0 W m$^{-1}$ K$^{-1}$, 10.125 W m$^{-1}$ K$^{-1}$, 0.417 W m$^{-1}$ K$^{-1}$, 0.674 W m$^{-1}$ K$^{-1}$, 0.673 W m$^{-1}$ K$^{-1}$, 0.950 W m$^{-1}$ K$^{-1}$, 0.613 W m$^{-1}$ K$^{-1}$, 0.614 W m$^{-1}$ K$^{-1}$, 0.325 W m$^{-1}$ K$^{-1}$, 10.017 W m$^{-1}$ K$^{-1}$, and 20.0 W m$^{-1}$ K$^{-1}$ respectively. At the current moment, effective density specific heat capacities of the anode plate, the anode flow channel, the anode GDL, the AMPL, the ACL, the PEM, the CCL, the CMPL, the cathode GDL, the cathode flow channel, and the cathode plate are 1.580×10$^6$ J m$^{-3}$ K$^{-1}$, 1.291×10$^6$ J m$^{-3}$ K$^{-1}$, 0.172×10$^6$ J m$^{-3}$ K$^{-1}$, 1.219×10$^6$ J m$^{-3}$ K$^{-1}$, 1.392×10$^6$ J m$^{-3}$ K$^{-1}$, 1.649×10$^6$ J m$^{-3}$ K$^{-1}$, 1.505×10$^6$ J m$^{-3}$ K$^{-1}$, 1.238×10$^6$ J m$^{-3}$ K$^{-1}$, 0.260×10$^6$ J m$^{-3}$ K$^{-1}$, 1.300×10$^6$ J m$^{-3}$ K$^{-1}$, and 1.580×10$^6$ J m$^{-3}$ K$^{-1}$ respectively.

A calculation expression for a parameter value of the heat source term at the current moment is as follows:

$$S_T = \begin{cases} \dfrac{I^2 ASR_{CL}}{3\delta_{CL}} + IV_{act,a} + S_{pc} & (ACL) \\ \dfrac{I^2 ASR_{CL}}{3\delta_{CL}} - \dfrac{T\Delta S}{2F}I + \\ IV_{act,c} + S_{pc} & (CCL) \\ \dfrac{I^2 ASR}{\delta} + S_{pc} & (MPL, GDL, \text{ and flow channel}) \\ \dfrac{I^2 ASR}{\delta} & (PEM \text{ and electrode plate}) \end{cases} \quad (23)$$

In the formula (23), $ASR_{CL}$ represents the resistance per unit area of the catalyst layer, ASR represents the resistance per unit area, $\delta_{CL}$ represents the thickness of the catalyst layer, $\delta$ represents the thickness, I represents the current density, $V_{act,a}$ and $V_{act,c}$ represent the activation loss voltage of the anode at the last moment and the activation loss voltage of the cathode at the last moment respectively, $\Delta S$ represents the entropy change, F represents the Faraday constant, and $S_{pc}$ represents the latent heat source term of the phase change at the current moment.

A calculation expression for the parameter value of the latent heat source term of the phase change at the current moment is as follows:

$$S_{pc} = \begin{cases} h_{cond}(S_{v-l} - S_{m-v}M_{H_2O}) & (ACL \text{ and } CCL) \\ h_{cond}S_{v-l} & (MPL, GDL, \text{ and flow channel}) \end{cases} \quad (24)$$

In the formula (24), $h_{cond}$ represents the coefficient of latent heat of evaporation, $S_{v-l}$ represents the parameter value of the phase change transition source term between the liquid water and the water vapor at the current moment, $S_{m-v}$ represents the parameter value of the phase change transition source term between the membrane water and the water vapor at the current moment, and $M_{H_2O}$ represents the molar mass of water.

The parameter value of the phase change transition source term between the membrane water and the water vapor at the current moment is determined based on the water vapor concentration at the last moment, the volume fraction of the liquid water at the last moment, and the temperature at the last moment. Its calculation formula is the same as the formula (15).

The parameter value of the phase change transition source term between the membrane water and the water vapor at the current moment is determined based on the content of the membrane water at the last moment, the content of equilibrium membrane water at the current moment, and the temperature at the last moment. Its calculation formula is the same as the formula (5).

Through the above calculations, it is obtained that at the current moment, the parameter values of the heat source term of the anode plate, the anode flow channel, the anode GDL, the AMPL, the ACL, the PEM, the CCL, the CMPL, the cathode GDL, the cathode flow channel, and the cathode plate are 4.715×10$^3$ W m$^{-3}$, 9.503×10$^3$ W m$^{-3}$, 1.023×10$^5$ W m$^{-3}$, −2.519×10$^5$ W m$^{-3}$, 9.761×10$^7$ W m$^{-3}$, 1.811×10$^7$ W m$^{-3}$, 4.481×10$^8$ W m$^{-3}$, 6.540×10$^6$ W m$^{-3}$, 5.875×10$^6$ W m$^{-3}$, 5.856×10$^6$ W m$^{-3}$, and 4.715×10$^3$ W m$^{-3}$ respectively.

The calculation results of the above effective density specific heat capacity, effective thermal conductivity, and heat source term are substituted into the temperature transfer equation, and it is obtained that at the current moment, temperatures of the anode plate, the anode flow channel, the anode GDL, the AMPL, the ACL, the PEM, the CCL, the CMPL, the cathode GDL, the cathode flow channel, and the cathode plate are 327.485 K, 327.691 K, 328.520 K, 329.247 K, 329.316 K, 329.369 K, 329.413 K, 329.351 K, 328.568 K, 327.731 K, and 327.567 K respectively.

As a preferred implementation, step 202 specifically includes the following sub-steps.

A1, an amount of nitrogen permeated from a cathode across the membrane to an anode is calculated based on the output results of the membrane water transfer equation and the temperature transfer equation according to the phenomenon of nitrogen transmembrane permeation inside the fuel cell.

A2, the output results of the gas transfer equation are calculated based on the gas transfer equation and the amount of nitrogen permeated from the cathode across the membrane to the anode.

The gas transfer equation is solved in the anode flow channel, the anode GDL, the AMPL, the ACL, the CCL, the CMPL, the cathode GDL, and the cathode flow channel.

A formula for calculating the amount of nitrogen permeated from the cathode across the membrane to the anode in step A1 is as follows:

$$S_{N_2\_cross} = D_{N_2\_cross} \frac{c_{N_2,CLc}RT_{CLc} - c_{N_2,CLa}RT_{CLa}}{\delta_{MEM}}. \quad (25)$$

In the formula (25), $S_{N_2\_cross}$ represents an amount of nitrogen permeated from the cathode across the membrane to the anode, $D_{N_2\_cross}$ represents a nitrogen transmembrane permeability coefficient, $c_{N_2,CLc}$ and $c_{N_2,CLa}$ represent nitrogen concentrations in the CCL and the ACL at the last moment respectively, R represents an ideal gas constant, $T_{CLc}$ and $T_{CLa}$ represent temperatures in the CCL and the ACL at the current moment respectively, and $\delta_{MEM}$ represents a thickness of the PEM.

A calculation expression for the nitrogen transmembrane permeability coefficient at the current moment is as follows:

$$D_{N_2\_cross} = \alpha_{N_2}(0.0295 + 1.21\psi - 1.93\psi^2)\exp\left[\frac{19830}{R}\left(\frac{1}{303} - \frac{1}{T_{MEM}}\right)\right]. \quad (26)$$

In the formula (26), $\alpha_{N_2}$ represents a constant, which depends on the type of the PEM. $\psi$ represents a volume fraction of membrane water in the PEM, and $$\psi = \frac{\lambda_{MEM} V_{H_2O}}{V_{MEM} + \lambda_{MEM} V_{H_2O}}.$$

$T_{MEM}$ represents a temperature in the PEM at the current moment. $\lambda_{MEM}$ represents a content of the membrane water in the PEM at the current moment. $V_{MEM}$ represents an equivalent volume of the PEM. $V_{H_2O}$ represents a molar volume of water.

At the last moment, the nitrogen concentrations in the ACL and the CCL are $7.224 \times 10^{-2}$ mol m$^{-3}$ and 31.969 mol m$^{-3}$. At the current moment, the temperatures in the ACL, the PEM, and the CCL are 329.259 K, 329.312 K, and 329.356 K respectively, and the content of the membrane water in the PEM is 7.153.

Figure 3:
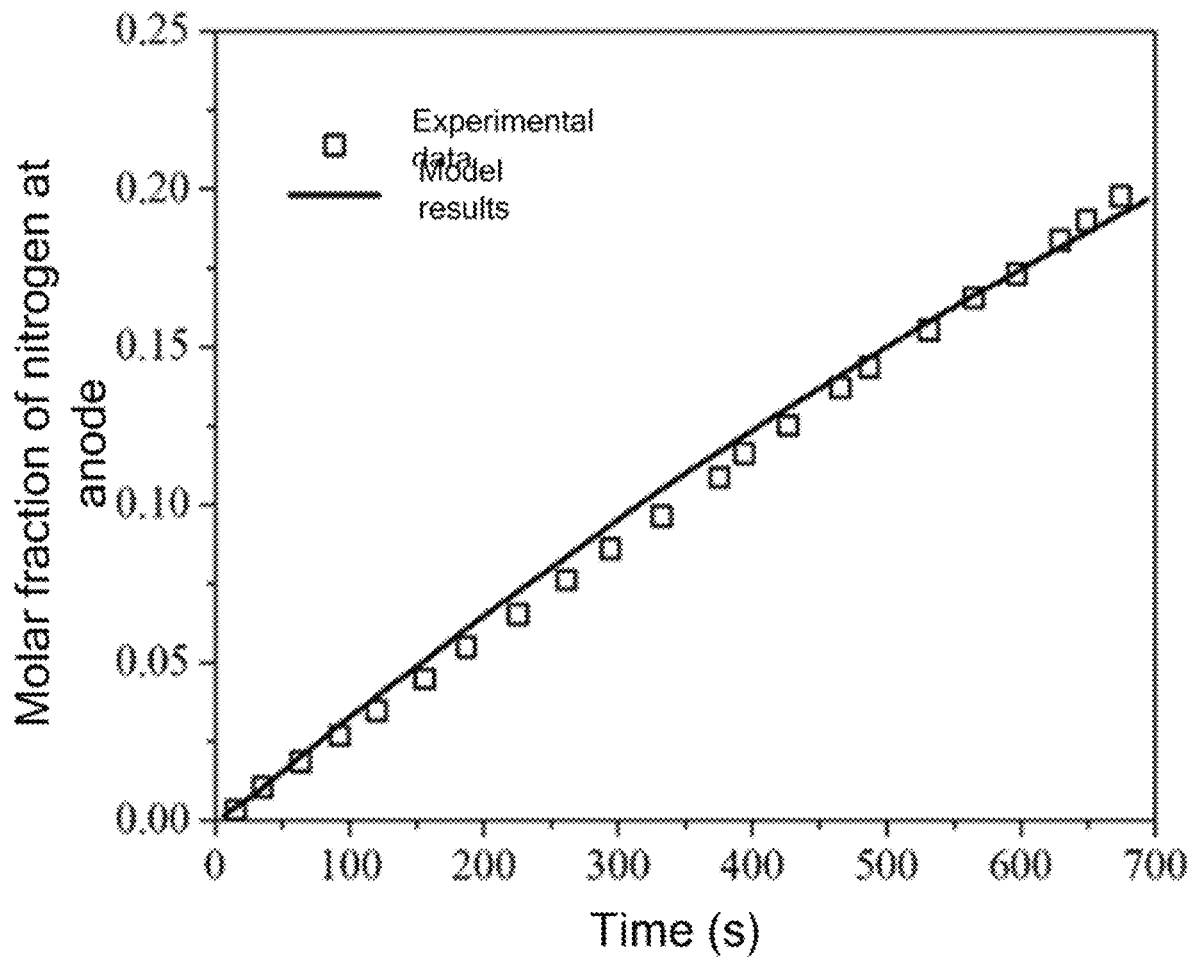
FIG. 3 is a graph of an anode nitrogen mole fraction calculated when the present disclosure is applied.

As shown in FIG. 3, the constant in the nitrogen transmembrane permeability coefficient in the experiment is $1 \times 10^{-15}$ mol m$^{-1}$ s$^{-1}$ Pa$^{-1}$, and the calculated nitrogen transmembrane permeability coefficient is $1.771 \times 10^{-15}$ m$^2$ s$^{-1}$. Through comparison with the experimental data, there is little difference between the two, and therefore, the amount of nitrogen permeated from the cathode across the membrane to the anode at the current moment can be calculated according to the calculated nitrogen transmembrane permeability coefficient, which is $6.602 \times 10^{-6}$ mol m$^{-2}$ s$^{-1}$.

A calculation expression for the gas transfer equation is as follows:

$$\begin{cases} \frac{\partial}{\partial t}(\varepsilon(1-s_{lq})\rho_g Y_i) = \nabla \cdot \quad \text{(catalyst layer, MPL, and GDL)} \\ (\rho_g D_i^{eff} \nabla Y_i) + S_i \\ \frac{\partial}{\partial t}((1-s_{lq})\rho_g Y_i) + \nabla \cdot \quad \text{(flow channel)} \\ (\rho_g u_g Y_i) = \nabla \cdot \\ (\rho_g D_i^{eff} \nabla Y_i) + S_i \end{cases} \quad (27)$$

In the formula (27), i represents hydrogen, oxygen, nitrogen, and water vapor, $\varepsilon$ represents the porosity, $s_{lq}$ represents the volume fraction of the liquid water at the current moment, $\rho_g$ represents the density of the gas, $Y_i$ represents the mass fraction of the gas, $D_i^{eff}$ represents the effective diffusion coefficient of the gas at the current moment, t represents the time, $u_g$ represents the gas velocity, and $S_i$ represents the gas source term.

The parameter value of the effective diffusion coefficient of the gas at the current moment is determined based on the output results of the liquid water transfer equation and the temperature transfer equation at the current moment.

Taking nitrogen as an example, formulas for calculating the effective diffusion coefficient of nitrogen at the current moment are as follows:

$$D_{N_2} = 2.982 \times 10^{-5} \left(\frac{T}{333.15}\right)^{1.5}\left(\frac{101325}{p}\right), \quad (28)$$

and $$D_{N_2}^{eff} = \varepsilon(1-s_{lq})^{1.5} D_{N_2}. \quad (29)$$

In the formulas (28) and (29), T represents the temperature at the current moment, p represents the gas pressure, $\varepsilon$ represents the porosity, and $s_{lq}$ represents the volume fraction of the liquid water at the current moment. $D_{N_2}$ is an intermediate variable.

A calculation expression for the source term of nitrogen at the current moment is as follows:

$$S_{N_2} = \begin{cases} -S_{N_2\_cross} & (CCL) \\ S_{N_2\_cross} & (ACL) \end{cases}. \quad (30)$$

In the formula (30), $S_{N_2\_cross}$ represents the amount of nitrogen permeated from the cathode across the membrane to the anode.

At the last moment, the nitrogen concentrations in the anode flow channel, the anode GDL, the AMPL, the ACL, the CCL, the CMPL, the cathode GDL, and the cathode flow channel are $7.213 \times 10^{-2}$ mol m$^{-3}$, $7.215 \times 10^{-2}$ mol m$^{-3}$, $7.221 \times 10^{-2}$ mol m$^{-3}$, $7.224 \times 10^{-2}$ mol m$^{-3}$, 31.969 mol m$^{-3}$, 31.969 mol m$^{-3}$, 31.969 mol m$^{-3}$, and 31.969 mol m$^{-3}$ respectively. The water vapor concentrations in the anode flow channel, the anode GDL, the AMPL, the ACL, the CCL, the CMPL, the cathode GDL, and the cathode flow channel are 1.072 mol m$^{-3}$, 1.082 mol m$^{-3}$, 1.105 mol m$^{-3}$, 1.120 mol m$^{-3}$, 5.381 mol m$^{-3}$, 5.323 mol m$^{-3}$, 5.178 mol m$^{-3}$, and 5.110 mol m$^{-3}$ respectively. The hydrogen concentrations in the anode flow channel, the anode GDL, the AMPL, and the ACL are 43.503 mol m$^{-3}$, 43.436 mol m$^{-3}$, 43.312 mol m$^{-3}$, and 43.212 mol m$^{-3}$ respectively. The oxygen concentrations in the CCL, the CMPL, the cathode GDL, and the cathode flow channel are 7.055 mol m$^{-3}$, 7.159 mol m$^{-3}$, 7.410 mol m$^{-3}$, and 7.546 mol m$^{-3}$ respectively.

The above effective diffusion coefficient of the gas and the gas source term are substituted into the gas transfer equation, and through calculations, it is obtained that at the current moment, the nitrogen concentrations in the anode flow channel, the anode GDL, the AMPL, the ACL, the CCL, the CMPL, the cathode GDL, and the cathode flow channel are $7.267 \times 10^{-2}$ mol m$^{-3}$, $7.270 \times 10^{-2}$ mol m$^{-3}$, $7.276 \times 10^{-2}$ mol m$^{-3}$, $7.279 \times 10^{-2}$ mol m$^{-3}$, 31.965 mol m$^{-3}$, 31.965 mol m$^{-3}$, 31.965 mol m$^{-3}$, and 31.965 mol m$^{-3}$ respectively. The water vapor concentrations in the anode flow channel, the anode GDL, the AMPL, the ACL, the CCL, the CMPL, the cathode GDL, and the cathode flow channel are 1.076 mol m$^{-3}$, 1.085 mol m$^{-3}$, 1.108 mol m$^{-3}$, 1.123 mol m$^{-3}$, 5.378 mol m$^{-3}$, 5.320 mol m$^{-3}$, 5.175 mol m$^{-3}$, and 5.107 mol m$^{-3}$ respectively. The hydrogen concentrations in the anode flow channel, the anode GDL, the AMPL, and the ACL are 43.490 mol m$^{-3}$, 43.423 mol m$^{-3}$, 43.300 mol m$^{-3}$, and 43.200 mol m$^{-3}$ respectively. The oxygen concentrations in the CCL, the CMPL, the cathode GDL, and the cathode flow channel are 7.055 mol m$^{-3}$, 7.159 mol m$^{-3}$, 7.411 mol m$^{-3}$, and 7.546 mol m$^{-3}$ respectively.

As a preferred implementation, step 203 specifically includes the following sub-steps.

The gas state parameters at an inlet of the fuel cell in the anode recirculation mode include an anode hydrogen flow rate at the inlet of the fuel cell, a flow rate of hydrogen supplied by a high-pressure hydrogen tank, and a temperature of gas at an inlet of an anode.

$$m_{H_2\_req} = \frac{IA_{cell}ST_a}{2F}, \tag{31}$$

$$m_{H_2\_tank} = m_{H_2\_req} - m_{H_2\_rec} \tag{32}, \text{ and}$$

$$T_{an\_inlet} = (m_{H_2\_tank}C_{p\_H\_di\ 2}M_{H_2}T_{H_2\_tank} + \\ (m_{H_2\_rec}C_{p\_H_2}M_{H_2} + m_{vp\_rec}C_{p\_vp}M_{H_2O} + \\ m_{N_2\_rec}C_{p\_N_2}M_{N_2}T_{CHa})/(m_{H_2\_req}C_{p\_H_2}M_{H_2} + \\ m_{vp\_rec}C_{p\_vp}M_{H_2O} + m_{N_2\_rec}C_{p\_N_2}M_{N_2}) \tag{33}.$$

In the formulas (31) to (33), $m_{H_2\_req}$ represents the anode hydrogen flow rate at the inlet of the fuel cell at the current moment, I represents a current density, $A_{cell}$ represents an effective reaction area of the fuel cell, $ST_a$ represents an anode stoichiometric ratio, and F represents a Faraday constant.

$m_{H_2\_tank}$ represents the flow rate of the hydrogen supplied by the high-pressure hydrogen tank at the current moment, and $m_{H_2\_rec}$, $m_{vp\_rec}$, and $m_{N_2\_rec}$ represent flow rates of hydrogen, water vapor, and nitrogen recycled in the anode recirculation mode respectively. The flow rate of hydrogen supplied by the hydrogen supply system comprises the flow rate of hydrogen supplied by the high-pressure hydrogen tank and the flow rate of hydrogen recycled in the anode recirculation mode.

$T_{an\_inlet}$ represents the temperature of the gas at the inlet of the anode at the current moment, $C_{p\_H_2}$, $C_{p\_vp}$, and $C_{p\_N_2}$ represent specific heat capacities of hydrogen, water vapor, and nitrogen respectively, $M_{H_2}$, $M_{H_2O}$, and $M_{N_2}$ represent molar masses of the hydrogen, the water vapor, and the nitrogen respectively, $T_{H_2\_tank}$ represents a temperature of hydrogen at an outlet of the hydrogen tank, and $T_{CHa}$ represents a temperature at an outlet of the anode flow channel at the current moment.

The parameter values of the flow rates of the hydrogen, the water vapor, and the nitrogen recycled in the anode recirculation mode at the current moment are determined based on the concentration of each gas and the gas velocity at the current moment.

$$m_{H_{2rec}} = uc_{H_2}A_{CH\_out}, \tag{34}$$

$$m_{N_{2rec}} = uc_{N_2}A_{CH\_out}, \text{ and} \tag{35}$$

$$m_{vp_{rec}} = uc_{vp}A_{CH\_out}. \tag{35}$$

In the formulas (34) to (36), u represents the gas velocity, $c_{H_2}$, $c_{H_2}$, and $c_{vp}$ represent the concentration of hydrogen, nitrogen, and water vapor at the current moment (determined by the output result of the gas transfer equation at the current moment), and $A_{CH\_out}$ represents the cross-sectional area of the outlet of the flow channel.

At the current moment, the flow rates of the hydrogen, the water vapor, and the nitrogen recycled in the anode recirculation mode are $1.052 \times 10^{-4}$ mol s$^{-1}$, $8.805 \times 10^{-6}$ mol s$^{-1}$, and $8.640 \times 10^{-7}$ mol s$^{-1}$ respectively, and the temperature at the outlet of the anode flow channel is 327.631 K.

Based on the above calculation formulas, through calculations, it is obtained that at the current moment, the flow rate of the hydrogen at the inlet of the anode required by the fuel cell is $6.219 \times 10^{-4}$ mol s$^{-1}$, the flow rate of the hydrogen supplied by the high-pressure hydrogen tank is $5.167 \times 10^{-4}$ mol s$^{-1}$, and the temperature of the gas at the inlet of the anode is 323.345 K.

As a preferred implementation, step 204 specifically includes the following sub-steps.

The output voltage performance of the fuel cell is solved as follows:

$$V_{out} = V_{Nernst} - V_{act} - V_{ohmic} - V_{conc}, \tag{37}$$

$$V_{act} = \frac{RT}{\alpha_a n_a F}\ln\left[\frac{I}{j_a\delta_{CLa}\dfrac{1+(1-1/ST_a)}{2c_{H_2,ref}}\dfrac{p_a}{RT}}\right] + \tag{38}$$

$$\frac{RT}{\alpha_c n_c F}\ln\left[\frac{I}{j_c\delta_{CLc}\dfrac{1+(1-1/ST_c)}{2c_{O_2,ref}}\dfrac{0.21\ p_c}{RT}}\right],$$

$$V_{ohmic} = I \cdot ASR, \text{ and} \tag{39}$$

$$V_{conc} = \frac{RT}{\alpha_a n_a F}\ln\left(1-\frac{I}{I_{lim,a}}\right) + \frac{RT}{\alpha_c n_c F}\ln\left(1-\frac{I}{I_{lim,c}}\right). \tag{40}$$

In the formulas (37) to (40), $V_{out}$ represents an output voltage. $V_{Nernst}$ represents an Nernst voltage. $V_{act}$ represents an activation loss voltage. $V_{ohmic}$ represents an ohmic loss voltage. $V_{conc}$ represents a concentration loss voltage. R represents an ideal gas constant. F represents a Faraday constant. T represents a temperature at the current moment. $c_{H_2,ref}$ and $c_{O_2,ref}$ represent concentrations of reference hydrogen and reference oxygen respectively. $\alpha_a$ and $\alpha_c$ represent an anodic charge transfer coefficient and a cathodic charge transfer coefficient respectively. $n_a$ and $n_c$ represent a number of electrons transferred by an anode and a number of electrons transferred by a cathode respectively. $j_a$ and $j_c$ represent an anodic reaction rate and a cathodic reaction rate at the current moment respectively. $p_a$ and $p_c$ represent an anode gas pressure and a cathode gas pressure respectively. $ST_a$ and $ST_c$ represent an anode stoichiometric ratio and a cathode stoichiometric ratio respectively. $\delta_{CLa}$ and $\delta_{CLc}$ represent thicknesses of the ACL and the CCL respectively. I represents a current density. ASR represents a resistance per unit area. $I_{lim,a}$ and $I_{lim,c}$ represent an anode limiting current density and a cathode limiting current density at the current moment respectively.

Calculation expressions for the anodic reaction rate and the cathodic reaction rate at the current moment are as follows:

$$j_a = (1-s_{lq})j_a^{ref}\exp\left(-1400\left(\frac{1}{T_{CLa}}-\frac{1}{353.15}\right)\right), \text{ and} \tag{41}$$

$$j_c = (1-s_{lq})j_c^{ref}\exp\left(-7900\left(\frac{1}{T_{CLc}}-\frac{1}{353.15}\right)\right). \tag{42}$$

In the formulas (41) to (42), $s_{lq}$ represents the volume fraction of the liquid water at the current moment, $j_a^{ref}$ and $j_c^{ref}$ represent reference anodic and cathodic reaction rates, and $T_{CLa}$ and $T_{CLc}$ represent the temperatures of the ACL and the CCL at the current time.

Calculation expressions for the anode limiting current density and the cathode limiting current density at the current moment are as follows:

$$I_{lim,a} = \frac{2Fc_{H_2\_CHa}}{\frac{0.5\delta_{CHa}}{D_{H_2\_CHa}^{eff}} + \frac{\delta_{GDLa}}{D_{H_2\_GDLa}^{eff}} + \frac{\delta_{MPLa}}{D_{H_2\_MPLa}^{eff}} + \frac{0.5\delta_{CLa}}{D_{H_2\_CLa}^{eff}}}, \text{ and} \quad (43)$$

$$I_{lim,c} = \frac{2Fc_{O_2\_CHc}}{\frac{0.5\delta_{CHc}}{D_{O_2\_CHc}^{eff}} + \frac{\delta_{GDLc}}{D_{O_2\_GDLc}^{eff}} + \frac{\delta_{MPLc}}{D_{O_2\_MPLc}^{eff}} + \frac{0.5\delta_{CLc}}{D_{O_2\_CLc}^{eff}}}. \quad (44)$$

In the formulas (43) to (44), F represents the Faraday constant. $c_{H_2\_CHa}$ represents the hydrogen concentration in the anode flow channel at the current moment. $\delta_{CHa}$, $\delta_{GDLa}$, $\delta_{MPLa}$, and $\delta_{CLa}$ represent the thicknesses of the anode flow channel, the anode GDL, the AMPL, and the ACL. $D_{H_2\_CHa}^{eff}$, $D_{H_2\_GDLa}^{eff}$, $D_{H_2\_MPLa}^{eff}$, and $D_{H_2\_CLa}^{eff}$ represent the effective diffusion coefficients of hydrogen in the anode flow channel, the anode GDL, the AMPL, and the ACL at the current moment. $c_{O_2\_CHc}$ represents the oxygen concentration in the cathode flow channel at the current moment. $D_{O_2\_CHc}^{eff}$, $D_{O_2\_GDLc}^{eff}$, $D_{O_2\_MPLc}^{eff}$, and $D_{O_2\_CLc}^{eff}$ represent the effective diffusion coefficients of oxygen in the cathode flow channel, the cathode GDL, the CMPL, and the CCL at the current moment.

Based on the above calculation expressions, through calculations, it is obtained that at the current moment, the activation loss voltage is 0.312 V, the ohmic loss voltage is 0.167 V, and the concentration loss voltage is $3.021\times10^{-4}$ V, such that the output voltage of the fuel cell is calculated to be 0.695 V.

FIG. 3 is a verification diagram of a nitrogen transmembrane permeation phenomenon and experimental data in a performance prediction method for a fuel cell in an anode recirculation mode according to the embodiment of the present disclosure. The simulation results are in excellent agreement with the experimental data, and the validity of the value of the nitrogen permeability coefficient is verified.

Figure 4:
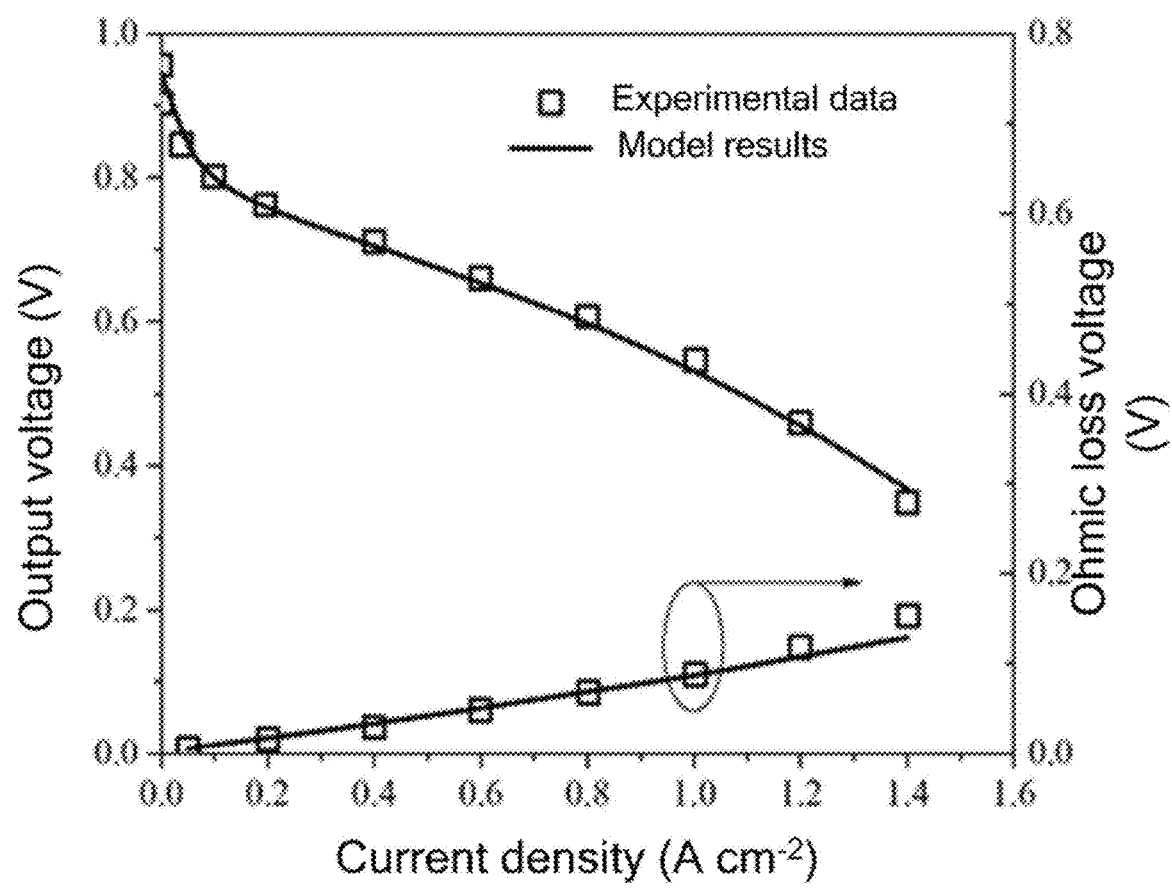
FIG. 4 is a schematic diagram of output performance of the fuel cell predicted when the present disclosure is applied.

FIG. 4 is a verification diagram of model simulation results and experimental data in the performance prediction method for a fuel cell in an anode recirculation mode according to the embodiment of the present disclosure. The simulation results are in excellent agreement with the experimental data, and the validity of the model is verified.

Figure 5:
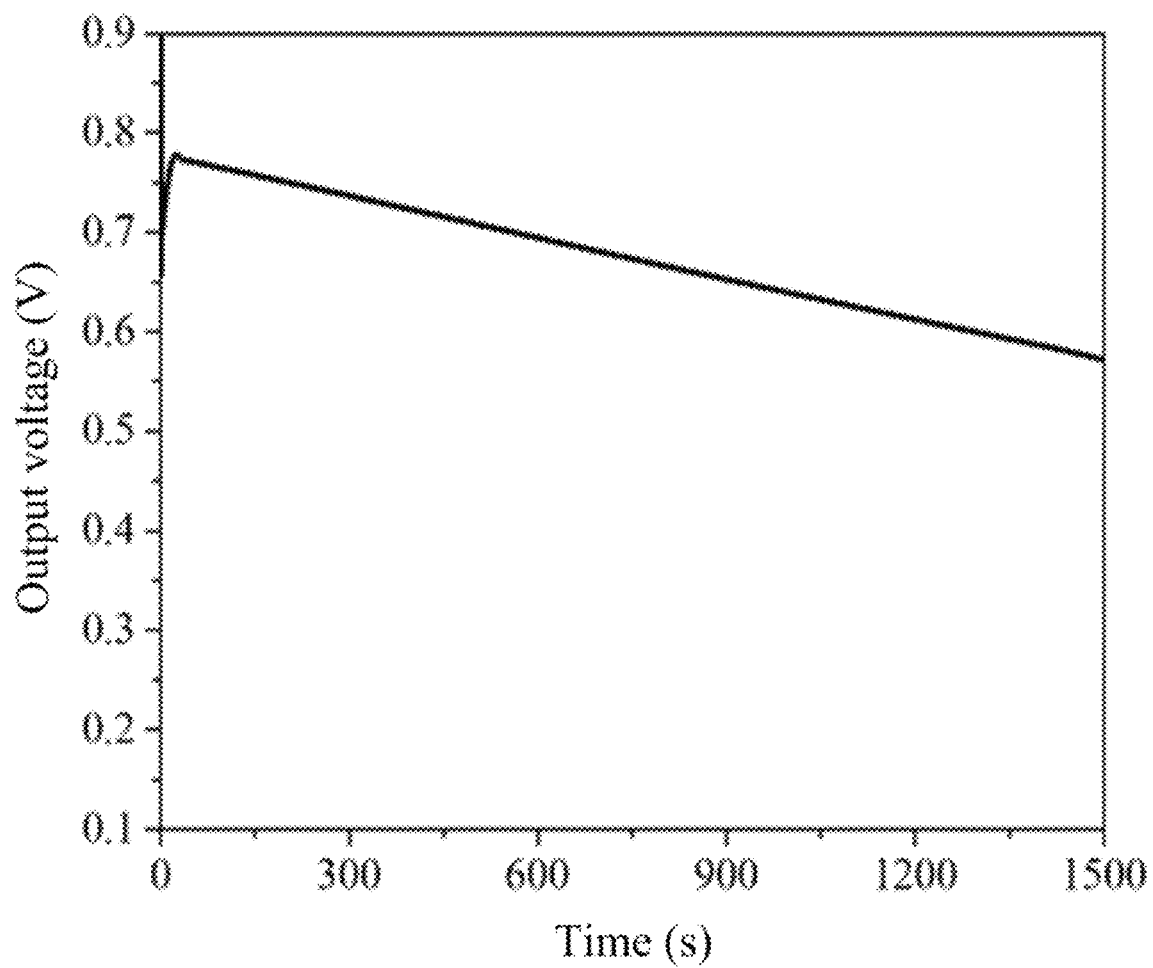
FIG. 5 is a graph showing variations of the output performance of the fuel cell with time when the present disclosure is applied.
Figure 6:
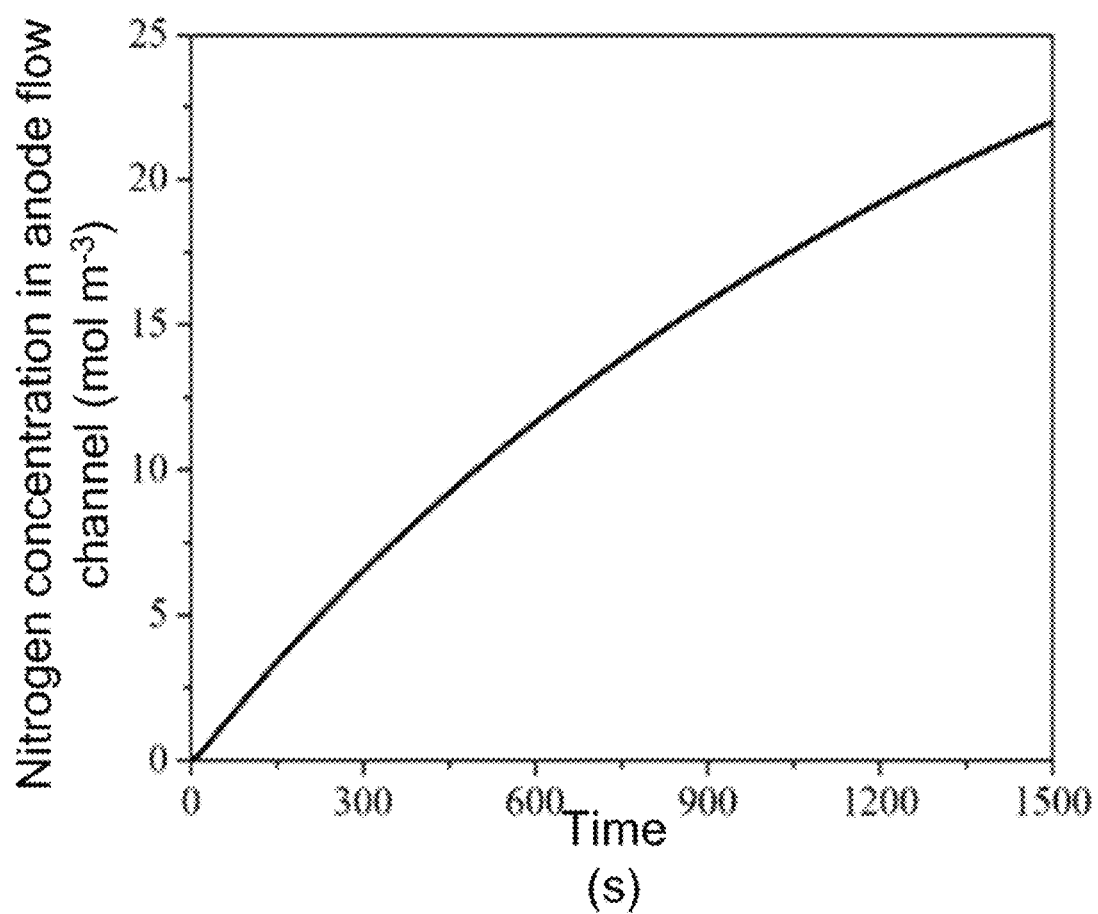
FIG. 6 is a graph showing variations of a nitrogen concentration in an anode flow channel with time when the present disclosure is applied.
Figure 7:
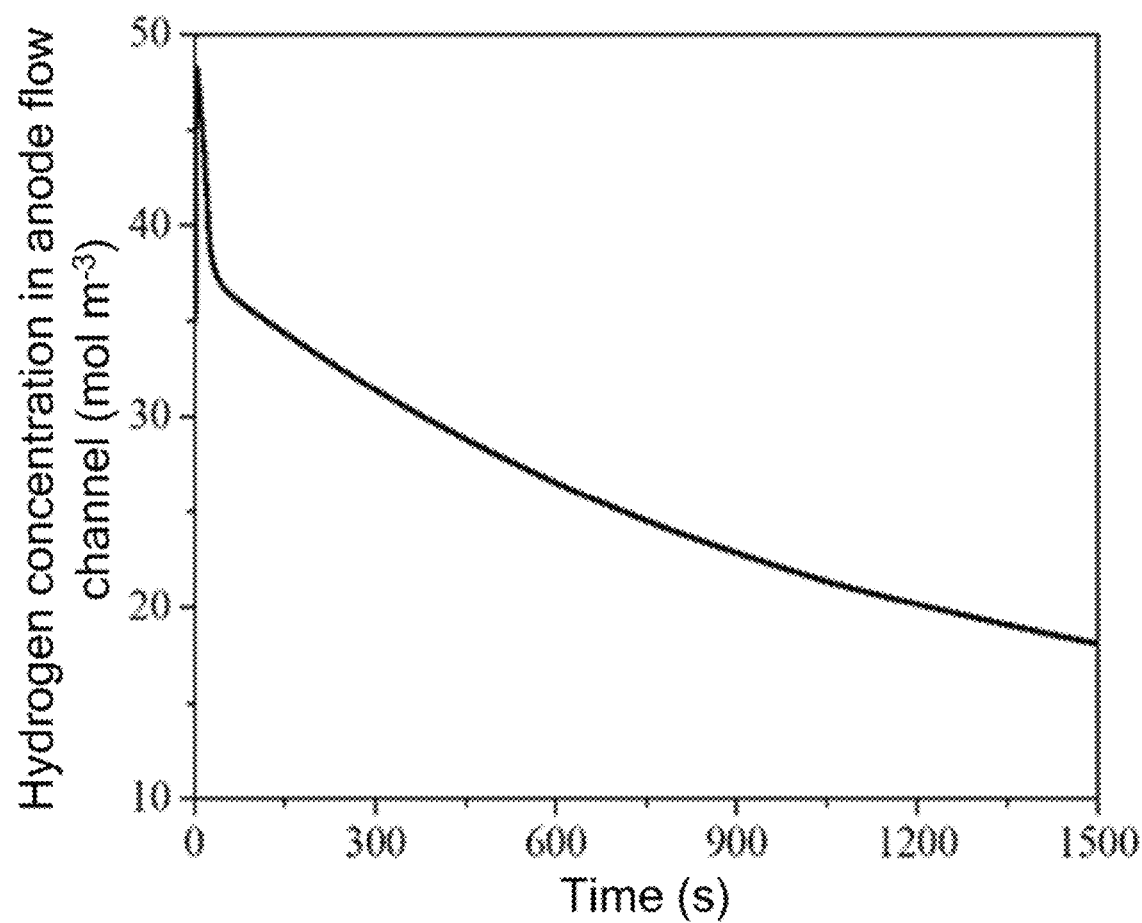
FIG. 7 is a graph showing variations of a hydrogen concentration in the anode flow channel with time when the present disclosure is applied.

FIG. 5 to FIG. 7 show implementation effects of the performance prediction method for a fuel cell in an anode recirculation mode according to the embodiment of the present disclosure. FIG. 5 is a graph showing variations of the output performance with time in the anode recirculation mode. FIG. 6 is a graph showing variations of a nitrogen concentration in an anode flow channel with time in the anode recirculation mode. FIG. 7 is a graph showing variations of a hydrogen concentration in the anode flow channel with time in the anode recirculation mode.

Embodiment II

Figure 8:
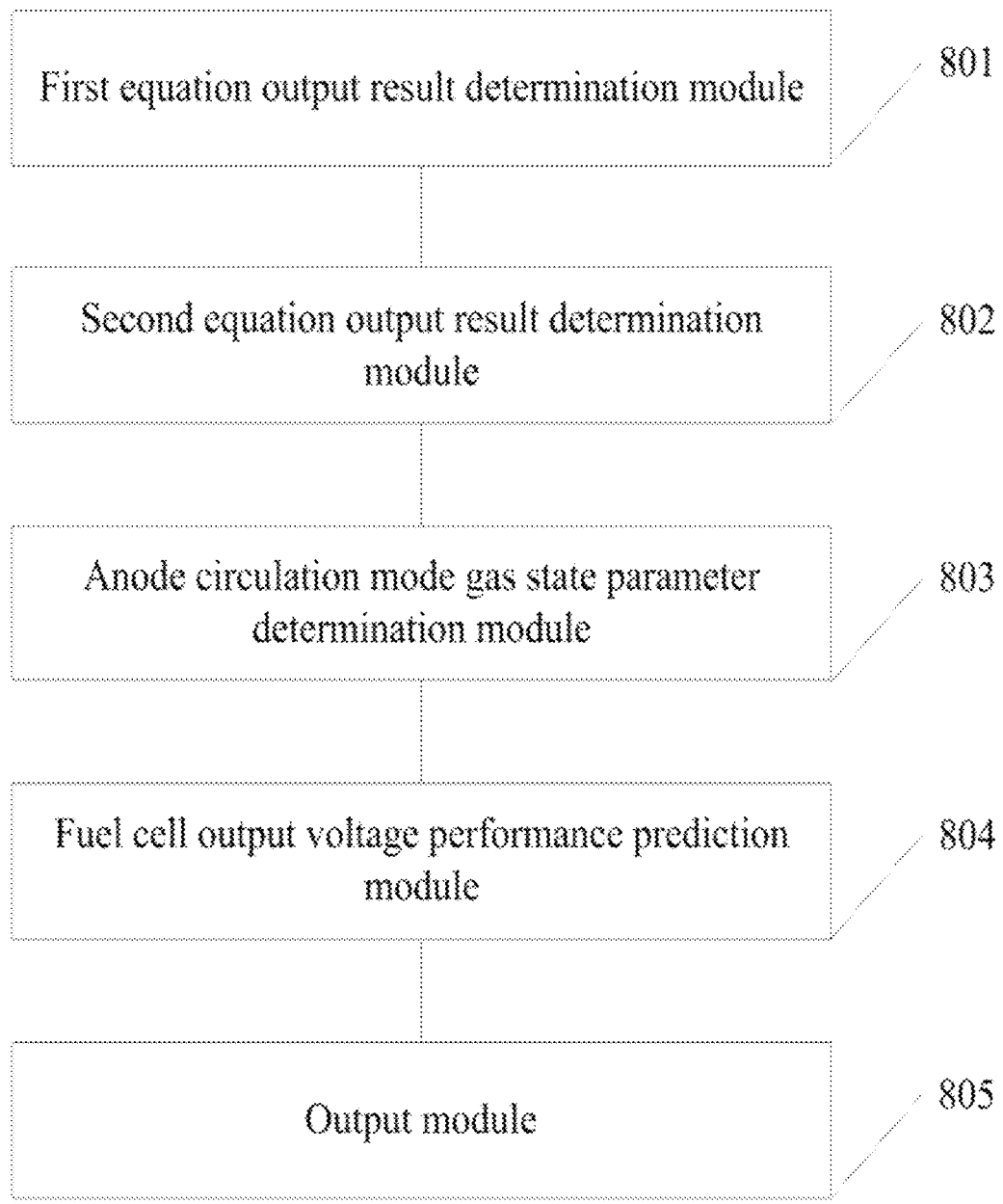
FIG. 8 is a structural diagram of a performance prediction system for a fuel cell in an anode recirculation mode according to the present disclosure.

The present disclosure provides a performance prediction system for a fuel cell in an anode recirculation mode. The fuel cell includes a cathode plate, a cathode flow channel, a cathode GDL, a CMPL, a CCL, a PEM, an ACL, an AMPL, an anode GDL, and an anode flow channel, and an anode plate in sequence in a nitrogen permeation direction. As shown in FIG. 8, the performance prediction system for a fuel cell includes: a first equation output result determination module 801, a second equation output result determination module 802, an anode recirculation mode gas state parameter determination module 803, a fuel cell output voltage performance prediction module 804, and an output module 805.

The first equation output result determination module 801 is configured to calculate output results of a membrane water transfer equation, a liquid water transfer equation, and a temperature transfer equation based on the membrane water transfer equation, the liquid water transfer equation, and the temperature transfer equation inside the fuel cell.

The second equation output result determination module 802 is configured to calculate output results of a gas transfer equation based on output results of a first labeling equation according to a phenomenon of nitrogen transmembrane permeation inside the fuel cell. The output results of the first labeling equation include the output results of the liquid water transfer equation, the temperature transfer equation, and the membrane water transfer equation.

The anode recirculation mode gas state parameter determination module 803 is configured to determine gas state parameters in the anode recirculation mode based on the output results of the temperature transfer equation and the gas transfer equation.

The fuel cell output voltage performance prediction module 804 is configured to predict output voltage performance of the fuel cell based on the gas state parameters in the anode recirculation mode and output results of a second labeling equation. The output results of the second labeling equation include the output results of the liquid water transfer equation, the temperature transfer equation, and the gas transfer equation.

The output module 805 is configured to output the output voltage performance of the fuel cell such that a flow rate of hydrogen supplied by a hydrogen supply system is controlled according to the output voltage performance of the fuel cell. In a preferred embodiment, the output module is configured to output the output results of the gas transfer equation and the output voltage performance of the fuel cell, such that a back pressure valve is controlled according to the output results of the gas transfer equation and the output voltage performance of the fuel cell.

Further, the system further includes: a parameter determination module configured to determine structural design parameters and operating condition parameters of the fuel cell.

Each embodiment of the present specification is described in a progressive manner, each embodiment focuses on the difference from other embodiments, and the same and similar parts between the embodiments may refer to each other. Since the system disclosed in an embodiment corresponds to the method disclosed in another embodiment, the description is relatively simple, and reference can be made to the method description.

Specific examples are used herein to explain the principles and embodiments of the present disclosure. The foregoing description of the embodiments is merely intended to help understand the method of the present disclosure and its core ideas; besides, various modifications may be made by those of ordinary skill in the art to specific implementations and the scope of application in accordance with the ideas of the present disclosure. In conclusion, the content of the present specification shall not be construed as limitations to the present disclosure.

What is claimed is:

1. A performance prediction method for a fuel cell in an anode recirculation mode, wherein the fuel cell comprises a cathode plate, a cathode flow channel, a cathode gas diffusion layer (GDL), a cathode microporous layer (CMPL), a cathode catalyst layer (CCL), a proton exchange membrane (PEM), an anode catalyst layer (ACL), an anode microporous layer (AMPL), an anode GDL, and an anode flow channel, and an anode plate in sequence in a nitrogen permeation direction; and the performance prediction method for a fuel cell in an anode recirculation mode comprises:

calculating output results of a membrane water transfer equation, a liquid water transfer equation, and a temperature transfer equation based on the membrane water transfer equation, the liquid water transfer equation, and the temperature transfer equation inside the fuel cell;

calculating output results of a gas transfer equation based on output results of a first labeling equation according to a phenomenon of nitrogen transmembrane permeation inside the fuel cell, wherein the output results of the first labeling equation comprise the output results of the liquid water transfer equation, the temperature transfer equation, and the membrane water transfer equation;

determining gas state parameters in the anode recirculation mode based on the output results of the temperature transfer equation and the gas transfer equation;

predicting output voltage performance of the fuel cell based on the gas state parameters in the anode recirculation mode and output results of a second labeling equation, wherein the output results of the second labeling equation comprise the output results of the liquid water transfer equation, the temperature transfer equation, and the gas transfer equation; and controlling a flow rate of hydrogen supplied by a hydrogen supply system according to the output voltage performance of the fuel cell.

2. The performance prediction method for a fuel cell in an anode recirculation mode according to claim 1, further comprising: determining structural design parameters and operating condition parameters of the fuel cell.

3. The performance prediction method for a fuel cell in an anode recirculation mode according to claim 1, wherein the membrane water transfer equation is:

$$\frac{\rho_{MEM}}{EW} \frac{\partial(\omega\lambda)}{\partial t} = \frac{\rho_{MEM}}{EW} \nabla \cdot (\omega^{1.5} D_{mw} \nabla \lambda) + S_{mw},$$

wherein $\rho_{MEM}$ represents a density of the PEM, EW represents an equivalent mass of the PEM, $\omega$ represents a polymer volume fraction, $\lambda$ represents a content of membrane water, t represents a time, $D_{mv}$ represents a diffusion coefficient of the membrane water, $S_{mw}$ represents a source term of the membrane water, $\nabla \cdot$ represents a divergence, and $\nabla$ represents a gradient;

the output results of the membrane water transfer equation comprise: contents of membrane water in the ACL, the PEM, and the CCL;

the liquid water transfer equation is:

$$\frac{\partial(\varepsilon \rho_{lq} s_{lq})}{\partial t} = \nabla \cdot \left(\rho_{lq} \frac{K_{lq}}{\mu_{lq}} \nabla p_l\right) + S_{lq},$$

wherein $\varepsilon$ represents a porosity, $\rho_{lq}$ represents a density of liquid water, $s_{lq}$ represents a volume fraction of the liquid water, $K_{lq}$ represents a permeability of the liquid water, $\mu_{lq}$ represents a dynamic viscosity of the liquid water, $p_l$ represents a hydraulic pressure, and $S_{lq}$ represents a source term of the liquid water;

the output results of the liquid water transfer equation comprise: volume fractions of liquid water in the anode GDL, the AMPL, the ACL, the cathode GDL, the CMPL, and the CCL;

the temperature transfer equation is:

$$\frac{\partial}{\partial t}\left((\rho c_p)^{eff}_{fl,sl} T\right) = \nabla \cdot \left(k^{eff}_{fl,sl} \nabla T\right) + S_T,$$

wherein $(\rho c_p)_{fl,sl}^{eff}$ represents an effective density specific heat capacity, T represents a temperature, $k_{fl,sl}^{eff}$ represents an effective thermal conductivity, and $S_T$ represents a heat source term; and the output results of the temperature transfer equation comprise temperatures in the anode plate, the anode flow channel, the anode GDL, the AMPL, the ACL, the PEM, the CCL, the CMPL, the cathode GDL, the cathode flow channel, and the cathode plate.

4. The performance prediction method for a fuel cell in an anode recirculation mode according to claim 1, wherein a process of calculating output results of a gas transfer equation based on output results of a first labeling equation according to a phenomenon of nitrogen transmembrane permeation inside the fuel cell specifically comprises:

calculating an amount of nitrogen permeated from a cathode across the membrane to an anode based on the output results of the membrane water transfer equation and the temperature transfer equation according to the phenomenon of nitrogen transmembrane permeation inside the fuel cell; and calculating the output results of the gas transfer equation based on the gas transfer equation, the amount of nitrogen permeated from the cathode across the membrane to the anode, and the output results of the liquid water transfer equation and the temperature transfer equation, wherein the output results of the gas transfer equation comprise a nitrogen concentration set, a water vapor concentration set, a hydrogen concentration set, and an oxygen concentration set;

the nitrogen concentration set comprises nitrogen concentrations in the anode flow channel, the anode GDL, the AMPL, the ACL, the CCL, the CMPL, the cathode GDL, and the cathode flow channel;

the water vapor concentration set comprises water vapor concentrations in the anode flow channel, the anode GDL, the AMPL, the ACL, the CCL, the CMPL, the cathode GDL, and the cathode flow channel;

the hydrogen concentration set comprises hydrogen concentrations in the anode flow channel, the anode GDL, the AMPL, and the ACL; and the oxygen concentration set comprises oxygen concentrations in the CCL, the CMPL, the cathode GDL, and the cathode flow channel.

5. The performance prediction method for a fuel cell in an anode recirculation mode according to claim 4, wherein a formula for calculating the amount of nitrogen permeated from the cathode across the membrane to the anode is:

$$S_{N_2\_cross} = D_{N_2\_cross} \frac{c_{N_2,CLc} R T_{CLc} - c_{N_2,CLa} R T_{CLa}}{\delta_{MEM}},$$

wherein $S_{N_2\_cross}$ represents an amount of nitrogen permeated from the cathode across the membrane to the anode at a current moment, $D_{N_2\_cross}$ represents a nitrogen transmembrane permeability coefficient at the current moment, $c_{N_2,CLc}$ and $c_{N_2,CLa}$ represent nitrogen concentrations in the CCL and the ACL at a last moment respectively, R represents an ideal gas constant, $T_{CLc}$ and $T_{CLa}$ represent temperatures in the CCL and the ACL at the current moment respectively, and $\delta_{MEM}$ represents a thickness of the PEM; and a formula for calculating the nitrogen transmembrane permeability coefficient at the current moment is:

$$D_{N_2\_cross} = \alpha_{N_2}(0.0295 + 1.21\ \psi - 1.93\ \psi^2)\exp\left[\frac{19830}{R}\left(\frac{1}{303} - \frac{1}{T_{MEM}}\right)\right],$$

wherein $\alpha_{N_2}$ represents a constant, $\psi$ represents a volume fraction of membrane water in the PEM, $$\psi = \frac{\lambda_{MEM} V_{H_2O}}{V_{MEM} + \lambda_{MEM} V_{H_2O}},$$

$T_{MEM}$ represents a temperature in the PEM at the current moment, $\lambda_{MEM}$ represents a content of the membrane water in the PEM at the current moment, $V_{MEM}$ represents an equivalent volume of the PEM, and $V_{H_2O}$ represents a molar volume of water.

6. The performance prediction method for a fuel cell in an anode recirculation mode according to claim 4, wherein gas transfer equations of the cathode GDL, the CMPL, the CCL, the ACL, the AMPL, and the anode GDL are all:

$$\frac{\partial}{\partial t}(\varepsilon(1-s_{liq})\rho_g Y_i) = \nabla \cdot (\rho_g D_i^{\mathit{eff}} \nabla Y_i) + S_i;$$

gas transfer equations of the cathode flow channel and the anode flow channel are both:

$$\frac{\partial}{\partial t}((1-s_{liq})\rho_g Y_i) + \nabla \cdot (\rho_g u_g Y_i) = \nabla \cdot (\rho_g D_i^{\mathit{eff}} \nabla Y_i) + S_i,$$

wherein i represents hydrogen, oxygen, nitrogen, or water vapor, $\varepsilon$ represents a porosity, $s_{liq}$ represents a volume fraction of liquid water at a current moment, $\rho_g$ represents a density of gas, $Y_i$ represents a mass fraction of the gas, $D_i^{\mathit{eff}}$ represents an effective diffusion coefficient of the gas at the current moment, t represents a time, $u_g$ represents a gas velocity, $S_i$ represents a gas source term, $\nabla\cdot$ represents a divergence, and $\nabla$ represents a gradient; and a parameter value of the effective diffusion coefficient of the gas at the current moment is determined based on the output results of the liquid water transfer equation and the temperature transfer equation at the current moment.

7. The performance prediction method for a fuel cell in an anode recirculation mode according to claim 1, wherein the gas state parameters in the anode recirculation mode comprise an anode hydrogen flow rate at an inlet of the fuel cell, a flow rate of hydrogen supplied by a high-pressure hydrogen tank, and a temperature of gas at an inlet of an anode; formulas for determining the gas state parameters are:

$$m_{H_2\_req} = \frac{IA_{cell}ST_a}{2F},$$

$$m_{H_2\_tank} = m_{H_2\_req} - m_{h_2\_rec}, \text{ and}$$

$$T_{an\_inlet} = \left(m_{H_2\_tank}C_{p\_H_2}M_{H_2}T_{H_2\_tank} + \right.$$
$$\left.(m_{H_2\_rec}C_{p\_H_2}M_{H_2} + m_{vp\_rec}C_{p\_vp}M_{H_2O} + m_{N_2\_rec}C_{p\_N_2}M_{N_2})T_{CHa}\right)/$$
$$\left(m_{H_2\_req}C_{p\_H_2}M_{H_2} + m_{vp\_rec}C_{p\_vp}M_{H_2O} + m_{N_2\_rec}C_{p\_N_2}M_{N_2}\right),$$

wherein $m_{H_2\_req}$ represents the anode hydrogen flow rate at the inlet of the fuel cell, I represents a current density, $A_{cell}$ represents an effective reaction area of the fuel cell, $ST_a$ represents an anode stoichiometric ratio, and F represents a Faraday constant;

$m_{H_2\_tank}$ represents the flow rate of the hydrogen supplied by the high-pressure hydrogen tank, and $m_{H_2\_rec}$, $m_{vp\_rec}$, and $m_{N_2\_rec}$ represent flow rates of hydrogen, water vapor, and nitrogen recycled in the anode recirculation mode respectively;

$T_{an\_inlet}$ represents the temperature of the gas at the inlet of the anode, $C_{p\_H_2}$, $C_{p\_vp}$, and $C_{p\_N_2}$ represent specific heat capacities of hydrogen, water vapor, and nitrogen respectively, $M_{H_2}$, $M_{H_2O}$, and $M_{N_2}$ represent molar masses of the hydrogen, the water vapor, and the nitrogen respectively, $T_{H_2\_tank}$ represents a temperature of hydrogen at an outlet of the hydrogen tank, and $T_{CHa}$ represents a temperature at an outlet of the anode flow channel; and the flow rates of the hydrogen, the water vapor, and the nitrogen recycled in the anode recirculation mode are determined based on the output results of the temperature transfer equation and the gas transfer equation;

wherein the flow rate of hydrogen supplied by the hydrogen supply system comprises the flow rate of hydrogen supplied by the high-pressure hydrogen tank and the flow rate of hydrogen recycled in the anode recirculation mode.

8. The performance prediction method for a fuel cell in an anode recirculation mode according to claim 1, wherein formulas for determining the output voltage performance of the fuel cell are:

$$V_{out} = V_{Nernst} - V_{act} - V_{ohmic} - V_{conc},$$

$$V_{act} = \frac{RT}{\alpha_a n_a F}\ln\left[\frac{I}{j_a \delta_{CLa}\dfrac{1+(1-1/ST_a)}{2c_{H_2,ref}} \cdot \dfrac{p_a}{RT}}\right] +$$

$$\frac{RT}{\alpha_c n_c F}\ln\left[\frac{I}{j_c \delta_{CLc}\dfrac{1+(1-1/ST_c)}{2c_{O_2,ref}} \cdot \dfrac{0.21\ p_c}{RT}}\right],$$

$$V_{ohmic} = I \cdot ASR, \text{ and}$$

$$V_{conc} = \frac{RT}{\alpha_a n_a F}\ln\left(1 - \frac{I}{I_{lim,a}}\right) + \frac{RT}{\alpha_c n_c F}\ln\left(1 - \frac{I}{I_{lim,c}}\right),$$

wherein $V_{out}$ represents an output voltage, $V_{Nernst}$ represents an Nernst voltage, $V_{act}$ represents an activation loss voltage, $V_{ohmic}$ represents an ohmic loss voltage, and $V_{conc}$ represents a concentration loss voltage;

R represents an ideal gas constant, F represents a Faraday constant, T represents a temperature, $c_{H_2,ref}$ and $c_{O_2,ref}$ represent concentrations of reference hydrogen and reference oxygen respectively, $\alpha_a$ and $\alpha_c$ represent an anodic charge transfer coefficient and a cathodic charge transfer coefficient respectively, $n_a$ and $n_c$ represent a number of electrons transferred by an anode and a number of electrons transferred by a cathode respectively, $j_a$ and $j_c$ represent an anodic reaction rate and a cathodic reaction rate respectively, $p_a$ and $p_c$ represent an anode gas pressure and a cathode gas pressure respectively, $ST_a$ and $ST_c$ represent an anode stoichiometric ratio and a cathode stoichiometric ratio respectively, $\delta_{CLa}$ and $\delta_{CLc}$ represent thicknesses of the ACL and the CCL respectively, I represents a current density, ASR represents a resistance per unit area, and $I_{lim,a}$ and $I_{lim,c}$ represent an anode limiting current density and a cathode limiting current density respectively;

the anodic reaction rate and the cathodic reaction rate are based on the output results of the liquid water transfer equation and the temperature transfer equation; and the anode limiting current density and the cathode limiting current density are determined based on the results of the gas transfer equation.

9. The performance prediction method for a fuel cell in an anode recirculation mode according to claim 1, further comprising: controlling a back pressure valve according to the output results of the gas transfer equation and the output voltage performance of the fuel cell.

10. A performance prediction system for a fuel cell in an anode recirculation mode, wherein the fuel cell comprises a cathode plate, a cathode flow channel, a cathode GDL, a CMPL, a CCL, a PEM, an ACL, an AMPL, an anode GDL, and an anode flow channel, and an anode plate in sequence in a nitrogen permeation direction; and the performance prediction system for a fuel cell in an anode recirculation mode comprises:

a first equation output result determination module configured to calculate output results of a membrane water transfer equation, a liquid water transfer equation, and a temperature transfer equation based on the membrane water transfer equation, the liquid water transfer equation, and the temperature transfer equation inside the fuel cell;

a second equation output result determination module configured to calculate output results of a gas transfer equation based on output results of a first labeling equation according to a phenomenon of nitrogen transmembrane permeation inside the fuel cell, wherein the output results of the first labeling equation comprise the output results of the liquid water transfer equation, the temperature transfer equation, and the membrane water transfer equation;

an anode recirculation mode gas state parameter determination module configured to determine gas state parameters in the anode recirculation mode based on the output results of the temperature transfer equation and the gas transfer equation;

a fuel cell output voltage performance prediction module configured to predict output voltage performance of the fuel cell based on the gas state parameters in the anode recirculation mode and output results of a second labeling equation, wherein the output results of the second labeling equation comprise the output results of the liquid water transfer equation, the temperature transfer equation, and the gas transfer equation; and an output module configured to output the output voltage performance of the fuel cell such that a flow rate of hydrogen supplied by a hydrogen supply system is controlled according to the output voltage performance of the fuel cell.

11. The performance prediction system for a fuel cell in an anode recirculation mode according to claim 10, further comprising: a parameter determination module configured to determine structural design parameters and operating condition parameters of the fuel cell.

12. The performance prediction system for a fuel cell in an anode recirculation mode according to claim 10, wherein, the output module is configured to output the output results of the gas transfer equation and the output voltage performance of the fuel cell, such that a back pressure valve is controlled according to the output results of the gas transfer equation and the output voltage performance of the fuel cell.

* * * * *